(12) United States Patent
Murakami et al.

(10) Patent No.: US 11,841,691 B2
(45) Date of Patent: Dec. 12, 2023

(54) INFORMATION PROCESSING DEVICE, INFORMATION PROCESSING METHOD, RECORDING MEDIUM, AND METHOD OF MANUFACTURING PRODUCT

(71) Applicant: CANON KABUSHIKI KAISHA, Tokyo (JP)

(72) Inventors: Shinji Murakami, Tokyo (JP); Yoshiaki Hiraoka, Kanagawa (JP); Kota Sakuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 17/197,146

(22) Filed: Mar. 10, 2021

(65) Prior Publication Data

US 2021/0294291 A1  Sep. 23, 2021

(30) Foreign Application Priority Data

Mar. 23, 2020 (JP) .................................. 2020-050520
Oct. 27, 2020 (JP) .................................. 2020-179432

(51) Int. Cl.
*G06F 8/65* (2018.01)
*G05B 19/042* (2006.01)
*G06F 8/30* (2018.01)

(52) U.S. Cl.
CPC ..... *G05B 19/0426* (2013.01); *G05B 19/0423* (2013.01); *G06F 8/30* (2013.01)

(58) Field of Classification Search
CPC .............................. G05B 19/0426; G06F 8/65
See application file for complete search history.

(56) References Cited

U.S. PATENT DOCUMENTS

| 5,907,494 A | * | 5/1999 | Dangelo | G06F 30/00 703/1 |
| 6,243,835 B1 | * | 6/2001 | Enokido | G06F 11/28 714/33 |
| 2002/0049737 A1 | | 4/2002 | Sakuma et al. | |
| 2010/0049337 A1 | * | 2/2010 | Sakagami | G05B 19/058 700/32 |
| 2011/0102617 A1 | * | 5/2011 | Seri | G06T 7/0004 348/222.1 |
| 2015/0066203 A1 | * | 3/2015 | Oonishi | G05B 19/41865 700/230 |

FOREIGN PATENT DOCUMENTS

| JP | H04-303205 A | 10/1992 |
| JP | 2000-047860 A | 2/2000 |
| JP | 2009-259072 A | 11/2009 |

OTHER PUBLICATIONS

Co-pending U.S. Appl. No. 17/193,895, filed Mar. 5, 2021.
Co-pending U.S. Appl. No. 17/197,157, filed Mar. 10, 2021.

* cited by examiner

Primary Examiner — Jae U Jeon
(74) Attorney, Agent, or Firm — Venable LLP

(57) ABSTRACT

An information processing device includes a data structure and a processing portion. The data structure is configured to share design information among a time chart, a flowchart, and a sequence program. The processing portion is configured to process the time chart, the flowchart, and the sequence program such that the time chart, the flowchart, and the sequence program link together, depending on the data structure.

16 Claims, 33 Drawing Sheets

FIG.23

| STEPPER NUMBER | STEPPER NAME | DEVICE NAME |
|---|---|---|
| 1 | | |
| 2 | CONVEYANCE | CONVEYANCE X-AXIS |
| 3 | CARRYING IN | CARRYING-IN Z-AXIS<br>CARRYING-IN CHUCK<br>CARRYING-IN X-AXIS |
| 4 | ADHESIVE APPLICATION | APPLICATION DISPENSER |
| 5 | CARRYING OUT | CARRYING-OUT Z-AXIS<br>CARRYING-OUT CHUCK<br>CARRYING-OUT X-AXIS |
| | | |

FIG.24

| DEVICE NAME | STATE NAME | DEVICE TYPE | I/O NUMBER |
|---|---|---|---|
| CARRYING-IN CHUCK | CLOSE | 2PD | Y110 |
| CARRYING-IN CHUCK | OPEN | 2PD | Y111 |
| DISPENSER | ON | 2PD | Y120 |
| DISPENSER | OFF | 2PD | Y121 |
| CARRYING-OUT | CLOSE | 2PD | Y130 |
| CARRYING-OUT CHUCK | OPEN | 2PD | Y131 |
| CARRYING-IN CHUCK | CLOSE | LS | X110 |
| CARRYING-IN CHUCK | OPEN | LS | X111 |
| DISPENSER | ON | LS | X120 |
| DISPENSER | OFF | LS | X121 |
| CARRYING-OUT CHUCK | CLOSE | LS | X130 |
| CARRYING-OUT CHUCK | OPEN | LS | X131 |
| CARRYING-IN PALLET WITH WORKPIECE | ON | PH | X150 |
| CARRYING-IN CHUCK WITH WORKPIECE | ON | PH | X160 |
| CARRYING-OUT CHUCK WITH WORKPIECE | ON | PH | X170 |
| CARRYING-OUT PALLET WITH WORKPIECE | ON | PH | X180 |

2PD···AIR CYLINDER (TWO POSITION)
LS···LIMIT SWITCH
PH···PHOTOSWITCH

FIG.25

| DEVICE NAME | CONTROLLER-CONTROL-MODULE NAME | CONTROLLER-CONTROL-MODULE ASSIGNMENT ADDRESS ||||||
|---|---|---|---|---|---|---|
| | | INPUT SIGNAL X STARTING ADDRESS | OUTPUT SIGNAL Y STARTING ADDRESS | PROCESSING SIGNAL M STARTING ADDRESS | PROCESSING SIGNAL D STARTING ADDRESS | ERROR SIGNAL L STARTING ADDRESS |
| CONVEYANCE X-AXIS | SINGLE-AXIS ROBOT MODULE | X1000 | Y1000 | M1200 | D10010 | L1200 |
| CARRYING-IN Z-AXIS | SINGLE-AXIS ROBOT MODULE | X1100 | Y1100 | M1250 | D10020 | L1250 |
| CARRYING-IN X-AXIS | SINGLE-AXIS ROBOT MODULE | X1200 | Y1200 | M1300 | D10030 | L1300 |
| APPLICATION | SIX-AXIS ROBOT MODULE | X1300 | Y1300 | M1350 | D10040 | L1350 |
| CARRYING-OUT Z-AXIS | SINGLE-AXIS ROBOT MODULE | X1400 | Y1400 | M1400 | D10050 | L1400 |
| CARRYING-OUT X-AXIS | SINGLE-AXIS ROBOT MODULE | X1500 | Y1500 | M1500 | D10060 | L1450 |

FIG.26

| ERROR NUMBER | ERROR NAME | ERROR OUTPUT ADDRESS |
|---|---|---|
| 1 | WORKPIECE PICKUP ERROR | L1001 |
| 2 | WORKPIECE DROP ERROR | L1002 |
| 3 | WORKPIECE RELEASE ERROR | L1003 |
| ∫ | ∫ | ∫ |
| 200 | CONVEYANCE X-AXIS ERROR | L1200 |
| ∫ | ∫ | ∫ |
| 250 | CARRYING-IN Z-AXIS ERROR | L1250 |
| ∫ | ∫ | ∫ |
| 300 | CARRYING-IN X-AXIS ERROR | L1300 |
| ∫ | ∫ | ∫ |
| 350 | APPLICATION ERROR | L1350 |
| ∫ | ∫ | ∫ |
| 400 | CARRYING-OUT Z-AXIS ERROR | L1400 |
| ∫ | ∫ | ∫ |
| 450 | CARRYING-OUT X-AXIS ERROR | L1450 |
| ∫ | ∫ | ∫ |

FIG.27

■SYSTEM-MODE ASSIGNMENT ADDRESS

| NAME | ADDRESS |
|---|---|
| FULLY-AUTOMATIC MODE | L1 |
| AUTOMATIC MODE | L2 |
| MANUAL MODE | L4 |
| ⑤ | ⑤ |

■SYSTEM-STATE ASSIGNMENT ADDRESS

| NAME | ADDRESS |
|---|---|
| ERROR | M14012 |
| ALARM | M14014 |
| WARNING | M14015 |
| STARTING | M14018 |
| ⑤ | ⑤ |

■BASIC-MODULE-PROCESSING ASSIGNMENT ADDRESS

| NAME | ADDRESS |
|---|---|
| ERROR CANCEL | M14005 |
| STOP COMMAND | M14035 |
| START COMMAND | M14036 |
| ⑤ | ⑤ |

FIG.28

■ IF-PROCESS-PORTION ASSIGNMENT ADDRESS

INPUT SIGNAL X

| NAME | ADDRESS |
|---|---|
| SERVO-ON STATE | X0000 |
| RETURN-TO-ORIGIN COMPLETED | X0001 |
| ERROR | X0002 |
| POSITIONING COMPLETED | X0003 |
| CURRENT POSITION 01 | X0004 |
| CURRENT POSITION 02 | X0005 |
| ~ | ~ |
| CURRENT POSITION 28 | X001F |

OUTPUT SIGNAL Y

| NAME | ADDRESS |
|---|---|
| SERVO ON | Y0000 |
| RETURN-TO-ORIGIN COMMAND | Y0001 |
| ERROR RESET | Y0002 |
| POSITIONING COMPLETED | Y0003 |
| COMMAND POSITION 01 | Y0004 |
| COMMAND POSITION 02 | Y0005 |
| ~ | ~ |
| COMMAND POSITION 28 | Y001F |

■ CONTROLLER-CONTROL-PORTION ASSIGNMENT ADDRESS

PROCESSING SIGNAL M

| NAME | ADDRESS |
|---|---|
| COMMAND DATA RECEIVED | M00 |
| ERROR CANCEL | M01 |
| MOVE-COMPLETION CHECKED | M02 |
| ~ | ~ |
| AUXILIARY | M49 |

PROCESSING SIGNAL D

| NAME | ADDRESS |
|---|---|
| COMMAND RECEIVED | D00 |
| COMMAND ACCEPTED | D01 |
| COMMAND COMPLETED | D02 |
| ~ | ~ |
| AUXILIARY | D09 |

ERROR SIGNAL L

| NAME | ADDRESS |
|---|---|
| RETURN-TO-ORIGIN-UNCOMPLETED ERROR | L100 |
| TIME-OUT-OF-MOVE ERROR | L101 |
| INTERLOCK ERROR | L102 |
| ~ | ~ |
| AUXILIARY | L109 |

FIG.31A

```
LD      L1001
OR      L1002
OR      L1003
OUT     M7001
LD      M14036
OR      M7002
ANI     M47
ANI     M7001
ANI     L4
ANI     M14005
OUT     M7002
LDI     M7002
MOV     K0
        D0
FMOV    K0
        K4M1000
        K3
LD      M1000
INC     D0
LD      M1001
AND     M501
INC     D0
LD      M1002
AND=    K2
        D10021
INC     D0
LD      M1003
AND     X110
INC     D0
LD      M1004
AND=    K1
        D10021
INC     D0
LD      M1005
AND     X160
INC     D0
LD      M1006
AND     M511
INC     D0
LD      M1007
AND=    K2
        D10031
INC     D0
LD      M1008
AND     X160
INC     D0
LD      M1009
AND     M521
INC     D0
LD      M1010
AND=    K2
        D10021
INC     D0
LD      M1011
AND     X111
INC     D0
LD      M1012
AND=    K1
        D10021
INC     D0
LD      M1013
ANI     X160
INC     D0
LD      M1014
AND     M531
INC     D0
LD      M1015
AND=    K1
        D10031
MOV     K47
        D0
LD      M7002
DECO    D0
        D190
        K6
BMOV    D190
        K4M1000
        K3
```

FIG.31B

```
LD      M1005
ANI     X160
LD      L1001
ANI     M14005
ORB
OUT     L1001
LD      M1008
ANI     X160
LD      L1002
ANI     M14005
ORB
OUT     L1002
LD      M1013
AND     X160
LD      L1003
ANI     M14005
ORB
OUT     L1003
```

INFORMATION PROCESSING DEVICE,
INFORMATION PROCESSING METHOD,
RECORDING MEDIUM, AND METHOD OF
MANUFACTURING PRODUCT

BACKGROUND OF THE INVENTION

Field of the Invention

The present invention relates to an information processing device, an information processing method, and the like.

Description of the Related Art

Various systems including production systems include a sequence control unit that includes a computer. The sequence control unit sequence-controls sequential operations of various devices of a corresponding system.

For performing the sequence control, a sequence program is generated. However, as the production system becomes large in scale and the number of the devices of the production system increases, the sequence program becomes complicated and man-hours in software design increases enormously. In addition, if the sequence program becomes large in scale, the possibility of occurrence of errors such as bugs increases and the quality of software decreases.

For this reason, in a method that is being developed, the sequence program is automatically generated by entering necessary information into a design document in which the sequence control is visualized.

For example, in a method disclosed in Japanese Patent Application Publication No. H04-303205, an actuator device map and a flow map are created. The actuator device map lists names of a plurality of devices installed in a production system. The names of the plurality of devices can be semantically recognized by an operator. The flow map lists the names and the order of operations of the devices. These two maps are linked with each other by using the names as keys, so that a sequence program for the production system is automatically generated.

After the sequence program is generated, debugging work is usually performed for checking whether the sequence program works as designed. If an error is found in the debugging work, the sequence program is usually corrected, checked for ensuring that the sequence program works normally, and fed back to the software design document.

However, in a conventional method such as the method disclosed in Japanese Patent Application Publication No. H04-303205, the sequence program is automatically generated, only in one-way flow from the software design document to the sequence program. Thus, if an error is found in the sequence program in the debugging work, the following procedure is performed. That is, the software design document is corrected, then the sequence program is generated again, and then the operation of the sequence program is checked again. If the sequence program has not been corrected completely, the same procedure will be repeated again. Thus, this is not preferable in terms of work efficiency. That is, the conventional method is not suitable for correcting errors.

In addition, in general, there is a plurality of software design documents with different types created for respective purposes, and these documents are often related to each other. Thus, if one software design document is corrected, the other related software design documents will have to be corrected, which will take time for correcting errors.

In addition, in the conventional method, a software design document and a mechanism design document are not in cooperation with each other. In the development of a production system or the like, a mechanism designer creates the mechanism design document, and after that, a software designer creates the software design document in accordance with the mechanism design document. However, since the mechanism design document and the software design document are not in cooperation with each other in the conventional method, creating the software design document by using the information of the mechanism design document involves enormous man-hours for entering information into the software design document. Thus, input errors may be caused and deteriorate the quality.

In addition, since the control method for automatically generating the sequence program is limited in the conventional method, a branch condition, a wait condition, an error handling process, and the like are not automatically generated. Thus, the conventional method cannot perform flexible control.

For this reason, it has been desired to achieve a method that increases the efficiency and the accuracy of the generation work and the correction work for the design document and the sequence program.

SUMMARY OF THE INVENTION

According to a first aspect of the present invention, an information processing device includes a data structure configured to share design information among a time chart, a flowchart, and a sequence program, and a processing portion. The processing portion is configured to process the time chart, the flowchart, and the sequence program such that the time chart, the flowchart, and the sequence program link together, depending on the data structure.

According to a second aspect of the present invention, an information processing method includes processing, by a processing portion, a time chart, a flowchart, and a sequence program such that the time chart, the flowchart, and the sequence program link together, depending on a data structure. The data structure is configured to share design information among the time chart, the flowchart, and the sequence program.

Further features of the present invention will become apparent from the following description of exemplary embodiments with reference to the attached drawings.

BRIEF DESCRIPTION OF THE DRAWINGS

FIG. 23 illustrates one example of the stepper configuration table of the embodiment.

FIG. 24 illustrates one example of the I/O table of the embodiment.

FIG. 25 illustrates one example of the controller-control-module management table of the embodiment.

FIG. 26 illustrates one example of the error table of the embodiment.

FIG. 27 illustrates one example of the basic-module address map of the embodiment.

FIG. 28 illustrates one example of the controller-control-module address map of the embodiment.

FIG. 31A illustrates one example of a sequence program that has been automatically generated in the embodiment.

FIG. 31B illustrates one example of another sequence program that has been automatically generated in the embodiment.

DESCRIPTION OF THE EMBODIMENTS

Figure 1:
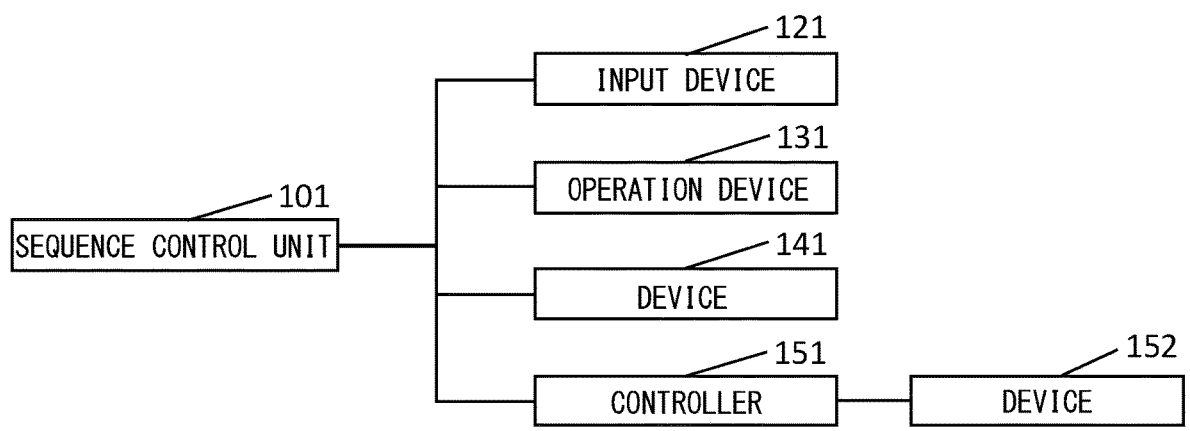
FIG. 1 illustrates a configuration of a control system of a production system of an embodiment of the present invention.

Hereinafter, an embodiment of the present invention will be described with reference to the accompanying drawings.

Note that in the following embodiment and examples, a component given an identical reference numeral has an identical function, unless otherwise specified.

EMBODIMENT

FIG. 1 is a block diagram illustrating a configuration of a control system of a production system that is one example of an embodiment of the present invention.

A sequence control unit 101 is connected with an input device 121, an operation device 131, a device 141, and a controller 151. The controller 151 is connected with a device 152. The sequence control unit 101 includes a computer that controls the devices connected with the sequence control unit 101.

The input device 121 may be a device, such as a sensor, that notifies the sequence control unit 101 of the state of the production system. The operation device 131 may be a device, such as a touch panel or a push-button switch, that is used for an operator to give an instruction to the sequence control unit 101. The device 141 may be a device, such as a cylinder, that is operated by the control signals ON and OFF alone, sent from the sequence control unit 101. The device 152 may be a device, such as a multi-axis robot or an image processing device, that can perform complicated operation under the control by the controller 151. The controller 151 receives an instruction from the sequence control unit 101, and controls the device 152.

Figure 2:
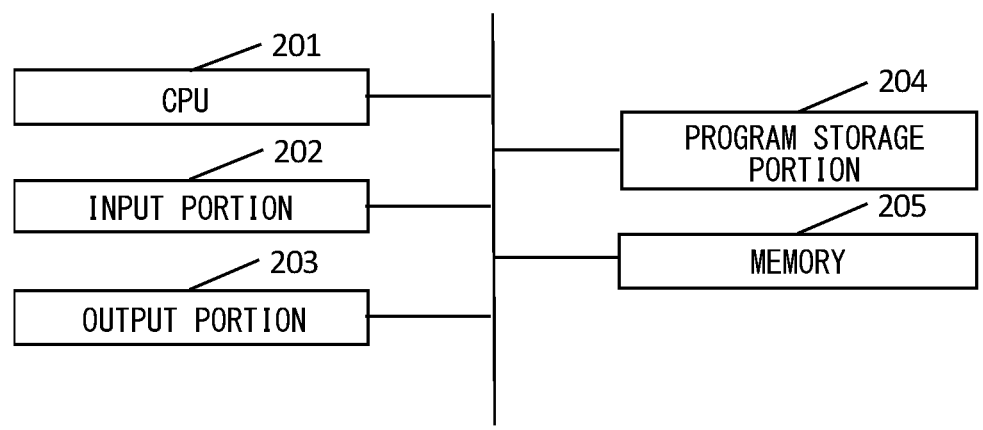
FIG. 2 illustrates a system configuration of a sequence control unit of the embodiment of the present invention.

FIG. 2 illustrates a system configuration of the sequence control unit 101 illustrated in FIG. 1. The sequence control unit 101 includes a CPU 201, an input portion 202, an output portion 203, a program storage portion 204, and a memory 205.

The CPU 201 is a computer that receives instructions and performs various processes including a computing process, a data creation process, a writing process to write data to the memory, and a reading process to read data from the memory.

The input portion 202 is an interface that receives, via a terminal block or a connector, signals sent from the input device 121, the operation device 131, the controller 151, and the like, to the sequence control unit 101.

The output portion 203 is an interface that sends, via a terminal block or a connector, signals to the operation device 131, the device 141, the controller 151, and the like.

The program storage portion 204 stores a later-described sequence program 381, which is executed by the CPU 201, and program comments. For example, a storage medium, such as a RAM, a ROM, or a memory card, may be used for the storage portion that serves as the program storage portion 204.

The memory 205 is a storage medium that stores information, such as computation results, in the computing process performed by the CPU 201. A storage medium, such as a RAM or an HDD, may be used for the memory 205.

Figure 3:
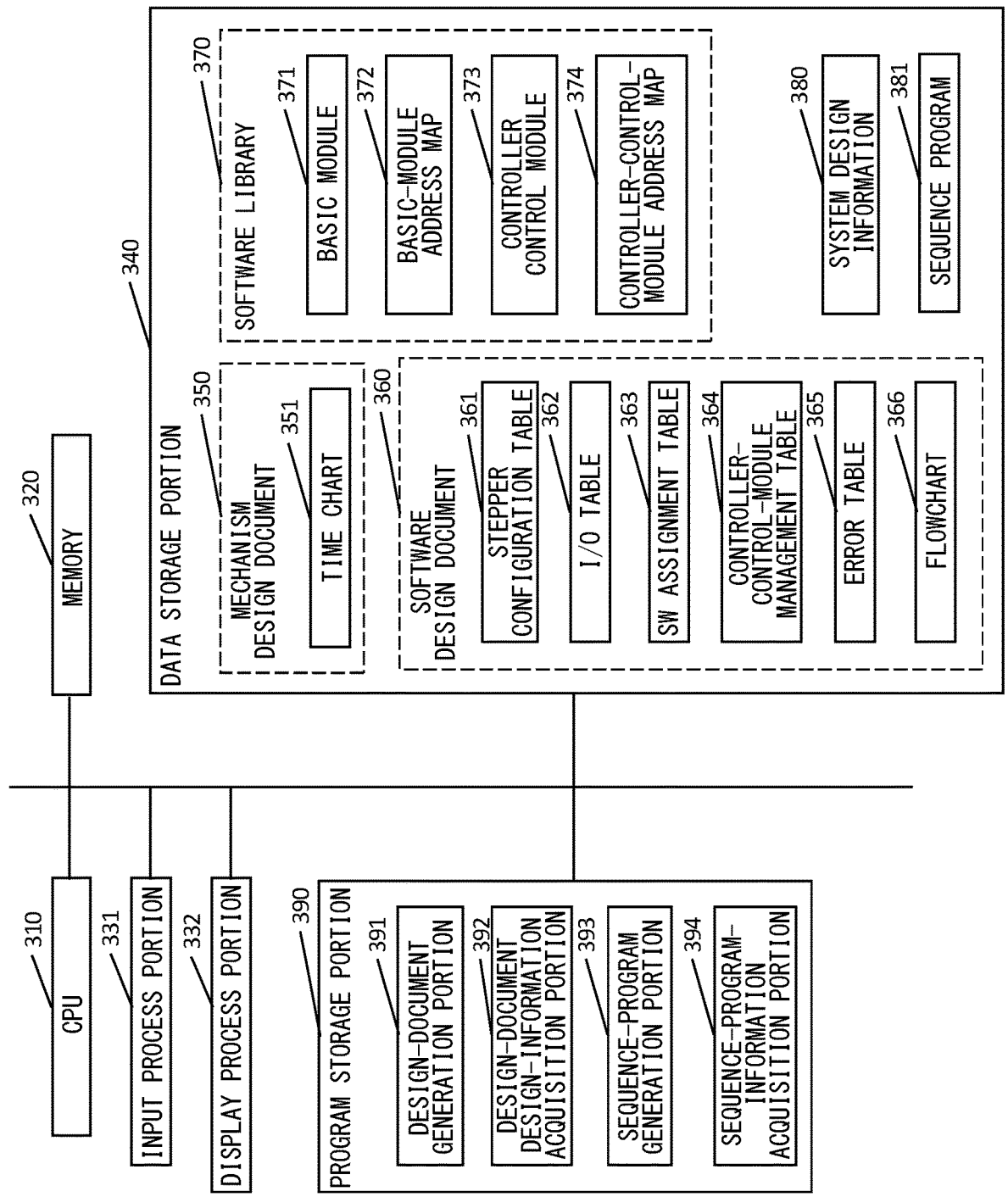
FIG. 3 illustrates a configuration of a production-system software design system of the embodiment of the present invention.

FIG. 3 is a block diagram illustrating a configuration of a production-system software design system of the embodiment of the present invention. The production-system software design system includes a CPU 310, a memory 320, an input process portion 331, a display process portion 332, a data storage portion 340, and a program storage portion 390. Note that since the functional elements of FIG. 3 are illustrated conceptually so that the functions of the elements can be understood, the elements may not necessarily be connected physically with each other as illustrated in FIG. 3. For example, a specific configuration in which functional blocks are distributed or unified is not limited to the example illustrated in FIG. 3, and part or all of the functional blocks may be functionally or physically distributed or unified in a predetermined unit, in accordance with a use state or the like. In addition, each functional block can be achieved by using hardware or software.

The CPU 310 is a computer that receives instructions and performs various processes including a computing process, a data creation process, a writing process to write data to the memory, and a reading process to read data from the memory. The memory 320 is a storage medium that stores computation results in the computing process performed by the CPU 310. The input process portion 331 receives information sent from an input device, such as a keyboard or a mouse. The display process portion 332 performs a process for displaying information on a display device, such as an LCD display.

The data storage portion 340 is a storage portion, and includes a storage area for storing a mechanism design document 350, a software design document 360, a software library 370, a system design information 380, and a sequence program 381.

The system design information 380 provides data structure that shares design information among a time chart, a flowchart, and the sequence program.

Each of a design-document generation portion 391, a design-document design-information acquisition portion 392, a sequence-program generation portion 393, and a sequence-program-information acquisition portion 394 of the program storage portion 390 stores a program that is executed by the CPU 310. A storage portion that serves as the data storage portion 340 and the program storage portion 390 includes a storage medium, such as a hard disk.

Next, the mechanism design document 350, the software design document 360, the software library 370, the system design information 380, and the sequence program 381, which are stored in the data storage portion 340, will be described in detail.

The mechanism design document 350 is information on the mechanism design necessary when the software design is performed, and includes a time chart 351.

The time chart 351 is a document used for a mechanism designer to examine operation times of sequential operations of the production system, which are performed in its normal state. Specifically, the time chart 351 illustrates the order of all operations of the devices 141 and 152, an operation time of each operation of the devices 141 and 152, and a transition time.

Figure 21:
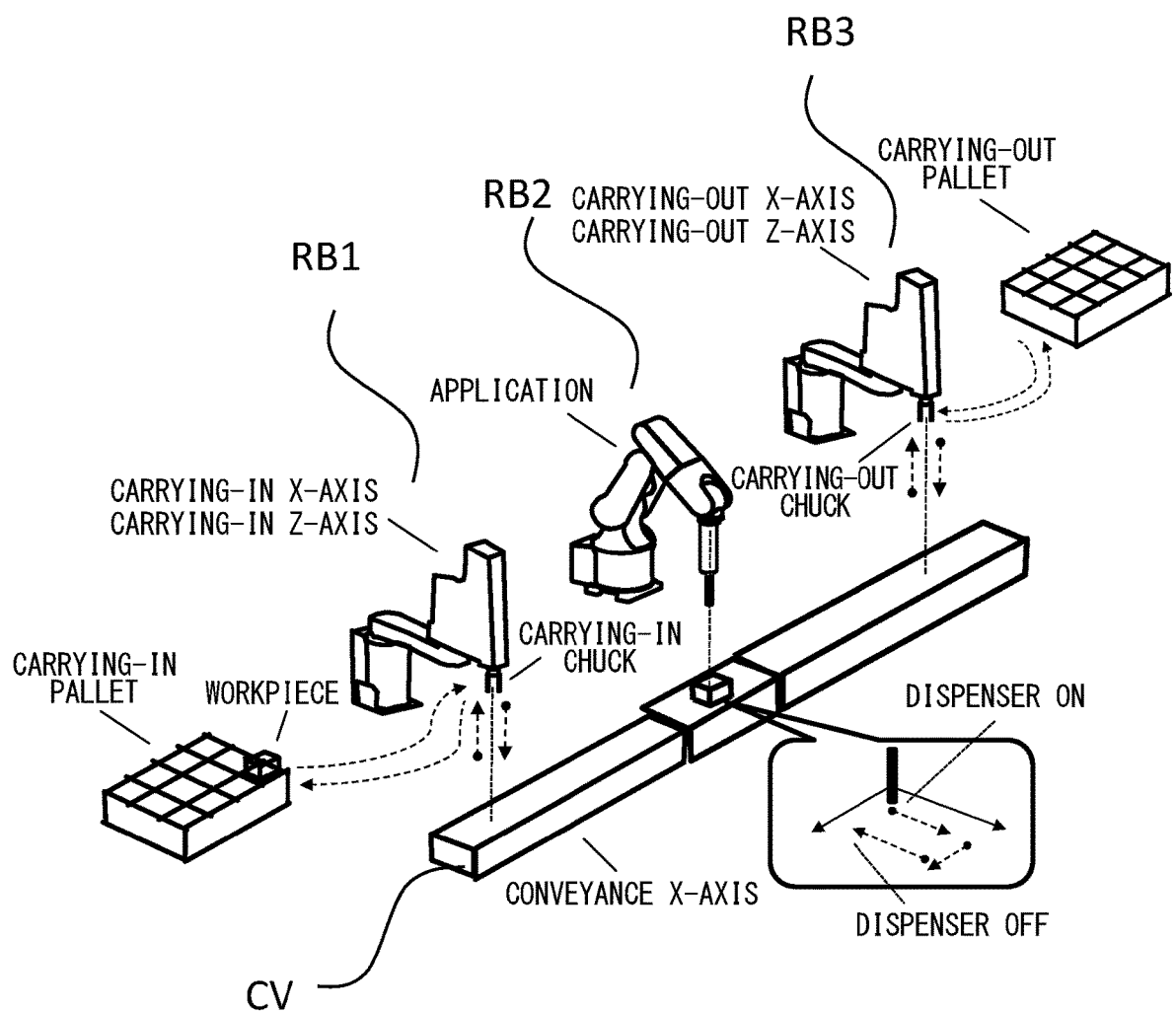
FIG. 21 illustrates a production system for which a sequence program has been generated by using information processing of the embodiment of the present invention.
Figure 22:
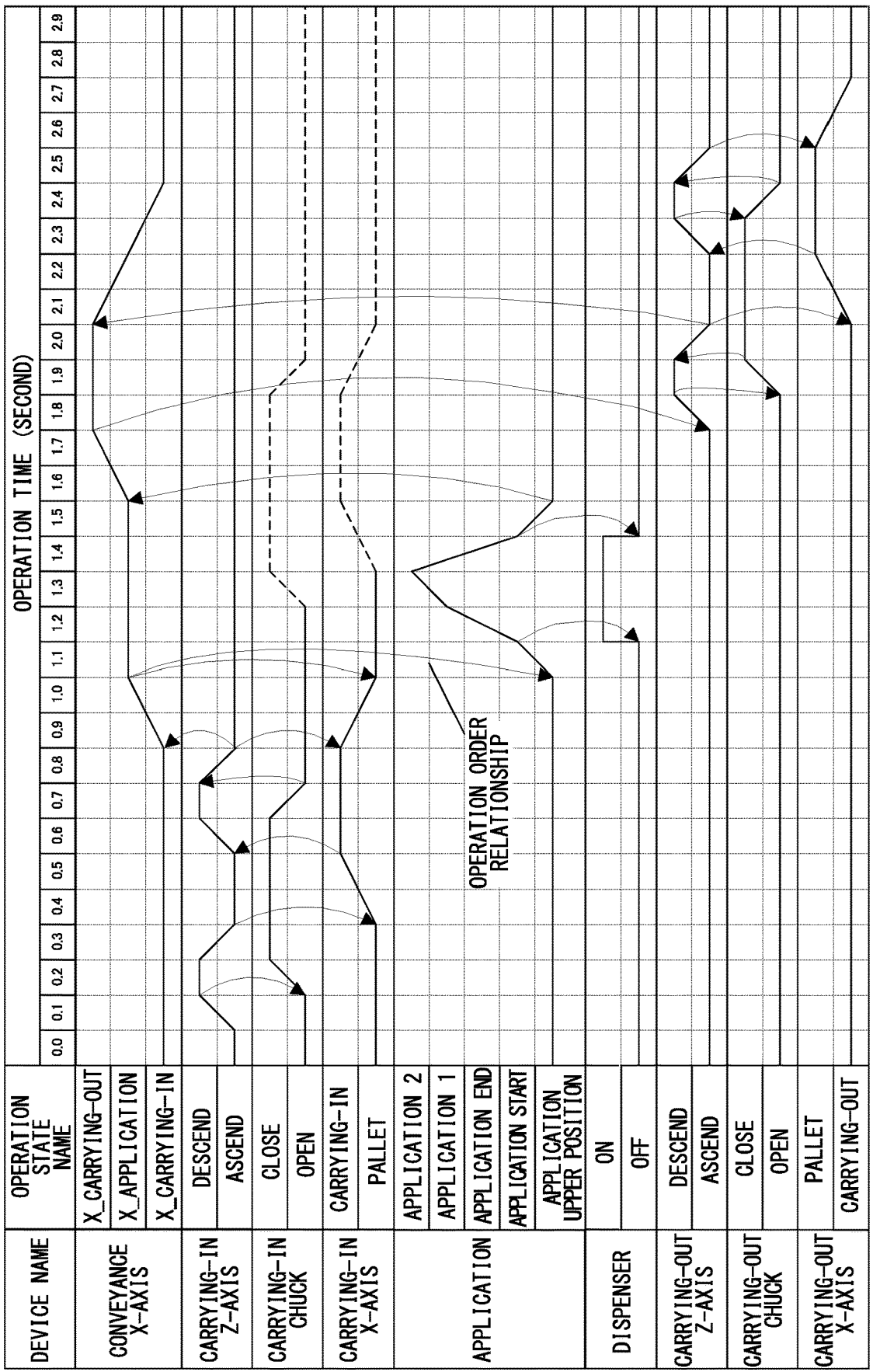
FIG. 22 illustrates one example of the time chart of the embodiment.

FIG. 22 illustrates one example of the time chart. The time chart illustrates the state of each device in sequential operations of a production system illustrated in FIG. 21. In the sequential operations, a carrying-in robot RB1 picks up a workpiece from a carrying-in pallet and puts the workpiece on a conveyance pallet CV, then the conveyance pallet CV conveys the workpiece to a working position of an applying robot RB2, and then the applying robot RB2 performs application work on the workpiece at the working position. When the applying robot RB2 completes the application work, the conveyance pallet CV conveys the workpiece to a receiving position of a carrying-out robot RB3. The carrying-out robot RB3 picks up the workpiece at the receiving position, then carries the workpiece, and then puts the workpiece on a carrying-out pallet. For the operation of the production system, the time chart of FIG. 22 illustrates the state of operation of each device, the order of operations of all devices, an operation time of each operation, and a transition time.

Figure 4:
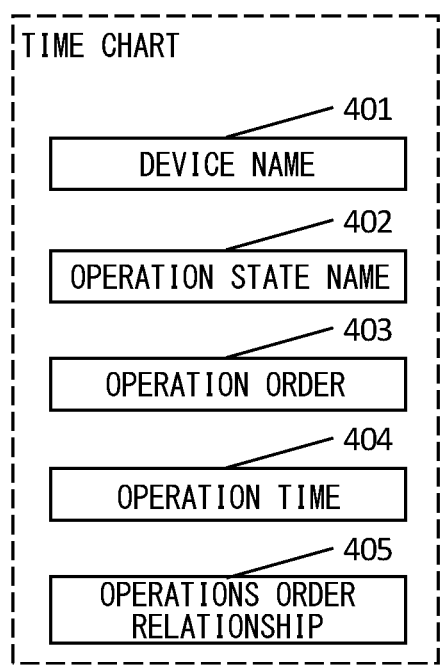
FIG. 4 illustrates information elements of a time chart of the embodiment of the present invention.

FIG. 4 schematically illustrates components of the time chart. The time chart includes information elements that are a device name 401, an operation state name 402, an operation order 403, an operation time 404, an operation order relationship 405. The device name 401 is given to identify each of the devices 141 and 152. The operation state name 402 is given to identify an operation state of each of the devices 141 and 152. The operation state indicates an operation position of each device, and at least two operation states are defined for each device. For example, if the device is a two-position cylinder, the device has two operation states, and is given names, such as "go" and "return" or "go out" and "return".

The operation order 403 indicates the change in all operations of the devices 141 and 152, that is, the order of all operations of the devices 141 and 152. The operation time 404 indicates an operation time of each operation, that is, a time taken from the start to the end of each operation. The operation order relationship 405 is an information element that indicates a cause-and-effect relationship between the end of an operation of one device and the start of an operation of another device.

Referring back to FIG. 3, the software design document 360 is illustrated. The software design document 360 is information necessary when the software design is performed, and includes a stepper configuration table 361, an I/O table 362, a SW assignment table 363, a controller-control-module management table 364, an error table 365, and a flowchart 366.

Figure 5:
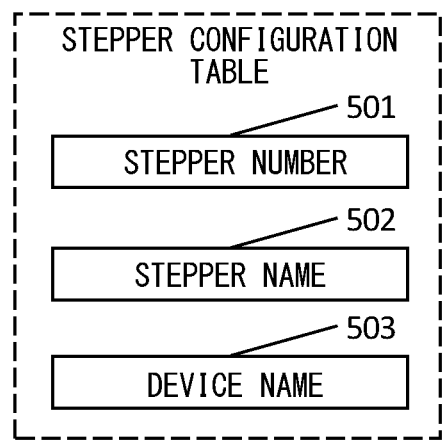
FIG. 5 illustrates information elements of a stepper configuration table of the embodiment of the present invention.

FIG. 5 illustrates a configuration of the stepper configuration table 361. As illustrated in FIG. 5, the stepper configuration table 361 is a list that includes information elements that are a stepper number 501, a stepper name 502, and a device name 503. Note that one stepper is a unit of the input device 121, the device 141, and the device 152, and is formed for easily controlling these devices.

The stepper is formed in the following three principles. First, a stepper includes an input device and a device that are controlled for the same purpose. Second, devices that belong to an identical stepper operate in synchronization with each other in the stepper. In other words, a device that operates asynchronously belongs to another stepper. Third, an input device and a device can belong to a single stepper, but cannot belong to a plurality of steppers. Note that one stepper can operate asynchronously with another stepper, and is affected by the operation of the other stepper. For example, one stepper checks the operation state of another stepper, and stops or restarts its operation depending on the operation state of the other stepper. Such a relationship between steppers, which affects each other, is expressed by the operation order relationship 405 in the time chart 351. The stepper number 501 is a number for a program to identify a stepper. The stepper name 502 is a name for a user of the production system to identify a stepper. The device name 503 is a name of each of the devices 141 and 152 that belongs to a stepper.

FIG. 23 illustrates one example of the stepper configuration table. The stepper configuration table corresponds to the sequential operations performed by the production system of FIG. 21. That is, the stepper configuration table corresponds to the time chart of FIG. 22.

Referring back to FIG. 3, the I/O table 362 is illustrated. The I/O table 362 is a list of the input device 121, the operation device 131, the device 141, and the controller 151, which are connected with the sequence control unit 101 via the input portion 202 and the output portion 203.

Figure 6:
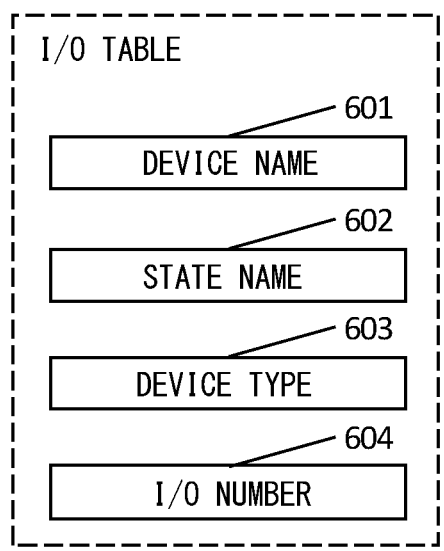
FIG. 6 illustrates information elements of an I/O table of the embodiment of the present invention.

FIG. 6 schematically illustrates components of the I/O table 362. As illustrated in FIG. 6, the I/O table 362 includes information elements that are a device name 601, a state name 602, a device type 603, and an I/O number 604. The device name 601 is given to identify each of the input device 121, the operation device 131, the device 141, and the device 152. The state name 602 is given to identify the state of each of the input device 121, the operation device 131, the device 141, and the device 152. The device type 603 is an identifier to identify a device used by each of the input device 121, the operation device 131, the device 141, and the device 152. For example, in the case of the device 141, the device type 603 indicates a device used by the device 141. For example, the device used by the device 141 and indicated by the device type 603 is a cylinder with a single or double solenoid. The I/O number 604 is the number of a terminal at which a device indicated by the device name 601 is connected to the sequence control unit 101 in the input portion 202 or the output portion 203.

FIG. 24 illustrates one example of the I/O table. The I/O table corresponds to the sequential operations performed by the production system of FIG. 21. That is, the I/O table corresponds to the time chart of FIG. 22.

Referring back to FIG. 3, the SW assignment table 363 is illustrated. The SW assignment table 363 is an address assignment list that is related to an interface for displaying and executing switches arranged in the operation device 131.

Figure 7:
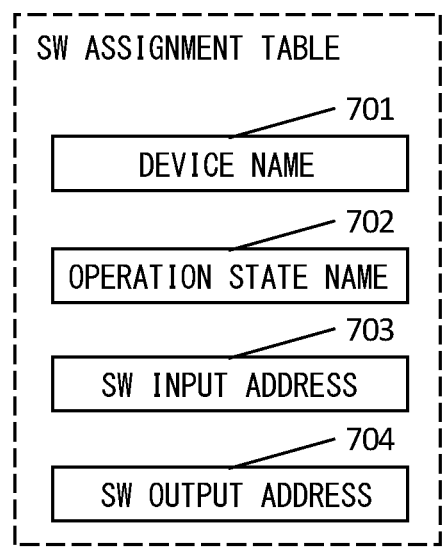
FIG. 7 illustrates information elements of a SW assignment table of the embodiment of the present invention.

FIG. 7 schematically illustrates components of the SW assignment table 363. As illustrated in FIG. 7, the SW assignment table 363 includes information elements that are a device name 701, an operation state name 702, a SW input address 703, and a SW output address 704. Each switch is provided for a corresponding state of a device, and a lamp of the switch can be turned on and off. If a button, of which lamp is turned off, is pressed, the device operates for its operation state. The lamp of the button is turned on if the states of the device of the production system become equal to the operation state.

The device name 701 is given to identify each of the devices 141 and 152. The operation state name 702 is given to identify an operation state of each of the devices 141 and 152. The SW input address 703 specifies an address that is a condition to turn on the lamp of a switch. The SW output address 704 specifies an address that is a condition to perform an operation performed after a corresponding switch is pressed.

Referring back to FIG. 3, the controller-control-module management table 364 is illustrated. The controller-control-module management table 364 is a table to manage the types and the number of later-described controller control modules 373 incorporated into the sequence program 381 and manage address assignment to the memory 205.

Figure 8:
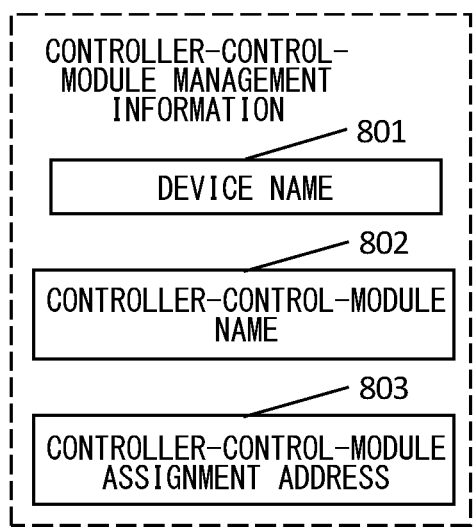
FIG. 8 illustrates information elements of controller-control-module management information of the embodiment of the present invention.

FIG. 8 schematically illustrates components of the controller-control-module management table 364. As illustrated in FIG. 8, the controller-control-module management table 364 includes information elements that are a device name 801, a controller-control-module name 802, and a controller-control-module assignment address 803.

The device name 801 is given to identify each of the devices 152. The controller-control-module name 802 is given to identify the type of a controller control module 373. When the controller-control-module management table 364 is created, names of the controller control modules 373 included in the software library 370 are extracted, and the extracted names are selected from a name list. The controller-control-module assignment address 803 is an address to assign a memory area used by the controller control module, and an I/O number, to the memory 205.

FIG. 25 illustrates one example of the controller-control-module management table 364. The controller-control-module management table 364 corresponds to the sequential operations performed by the production system of FIG. 21. That is, the controller-control-module management table 364 corresponds to the time chart of FIG. 22.

Referring back to FIG. 3, the error table 365 is illustrated. The error table 365 is a list that manages errors that may occur in the production system.

Figure 9:
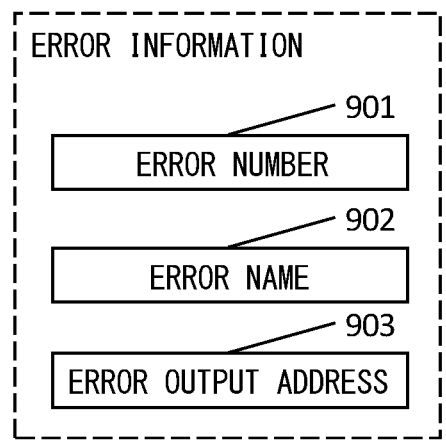
FIG. 9 illustrates information elements of error information of the embodiment of the present invention.

FIG. 9 schematically illustrates components of the error table 365. As illustrated in FIG. 9, the error table 365 includes information elements that are an error number 901, an error name 902, and an error output address 903. The error number 901 is given to identify an error. The error name 902 is given to identify an error. The error output address 903 is an address to assign a flag, used for the sequence program 381 to notify an operator of an error, to the memory 205.

FIG. 26 illustrates one example of the error table 365. The error table 365 corresponds to the sequential operations performed by the production system of FIG. 21. That is, the error table 365 indicates errors that may occur when operations illustrated in the time chart of FIG. 22 are performed.

Figure 20:
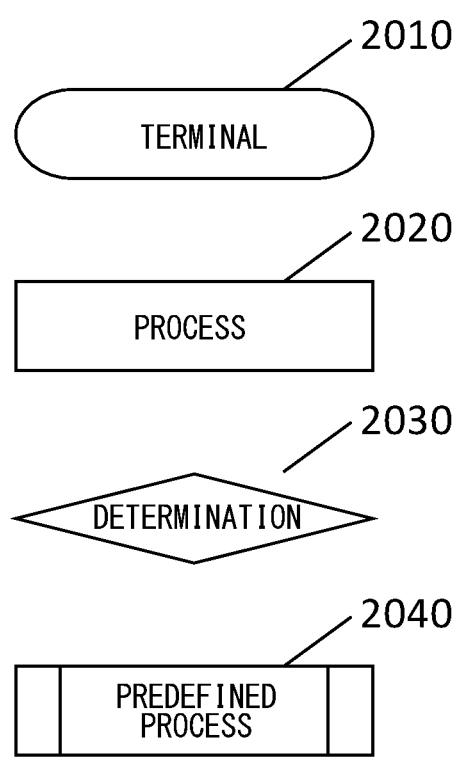
FIG. 20 illustrates an example of figures of a flowchart element of the embodiment of the present invention.

Referring back to FIG. 3, the flowchart 366 is illustrated. The flowchart 366 illustrates a flow of processes of the sequence program 381, and is created for each stepper. As illustrated in FIG. 20, in the flowchart 366, figures representing a terminal 2010, a process 2020, a determination 2030, and a predefined process 2004 are combined.

Figure 10:
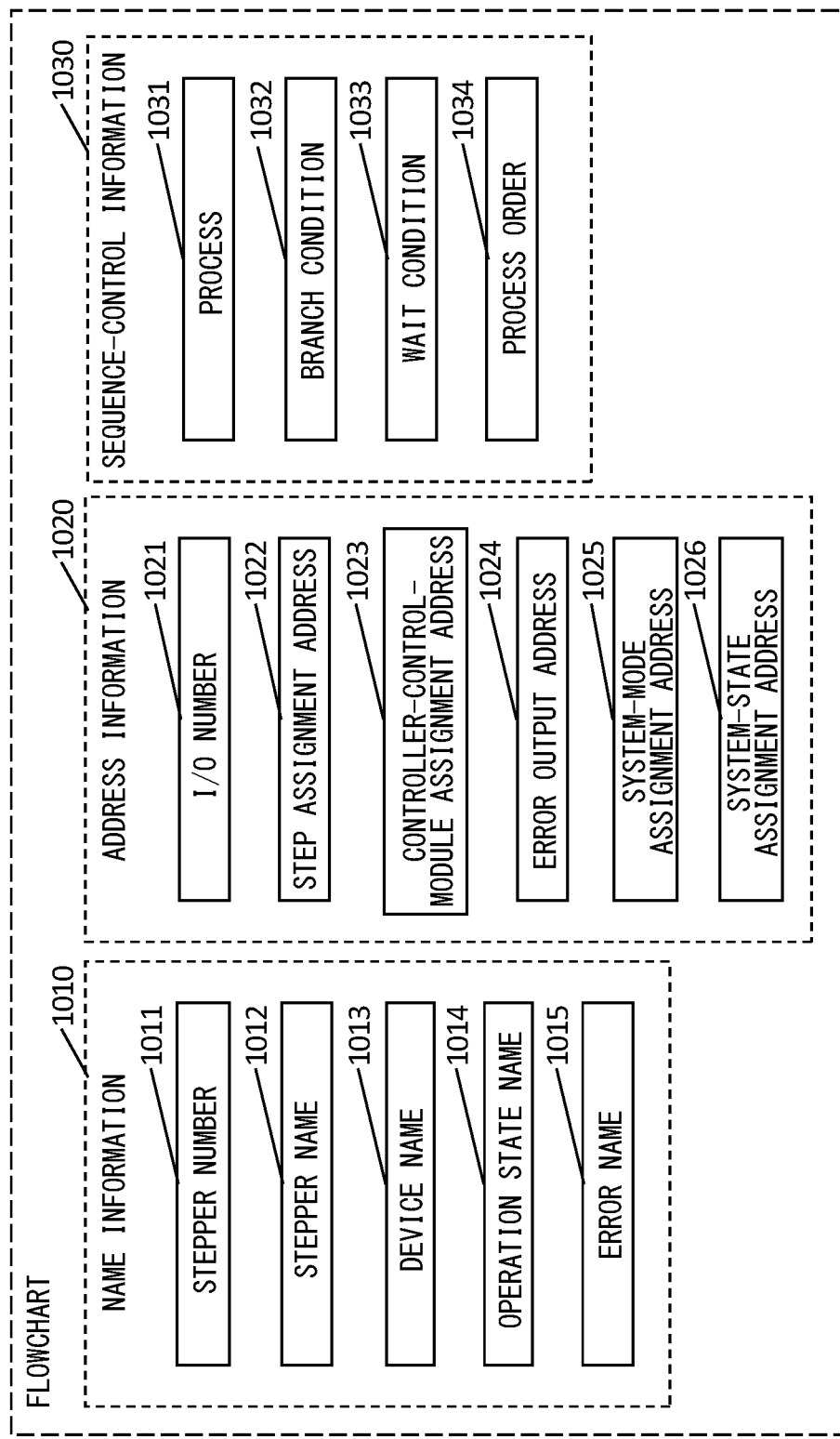
FIG. 10 illustrates information elements of a flowchart of the embodiment of the present invention.

FIG. 10 schematically illustrates components of the flowchart 366. As illustrated in FIG. 10, the flowchart 366 includes name information 1010, address information 1020, and sequence-control information 1030.

The name information 1010 includes a stepper number 1011, a stepper name 1012, a device name 1013, an operation state name 1014, and an error name 1015. The address information 1020 includes an I/O number 1021, a step assignment address 1022, a controller-control-module assignment address 1023, an error output address 1024, a system-mode assignment address 1025, and a system-state assignment address 1026. The sequence-control information 1030 includes information elements that are a process 1031, a branch condition 1032, a wait condition 1033, and a process order 1034.

The stepper number 1011 is a number to identify a stepper, and is the same as the stepper number 501 of the stepper configuration table 361. The stepper name 1012 is a name for a user of the production system to identify a stepper, and is the same as the stepper name 502 of the stepper configuration table 361. The device name 1013 is given to identify each of the devices 141 and 152, and is the same as the device name 503 of the stepper configuration table 361. The operation state name 1014 is given to identify an operation state of each of the devices 141 and 152. Thus, the flowchart and the stepper configuration table are shared-data structures that allow the flowchart and the stepper configuration table to share identical data.

The error name 1015 is given to identify an error, and is the same as the error name 902 of the error table 365. Thus, the flowchart and the error table are shared-data structures that allow the flowchart and the error table to share identical data.

The I/O number 1021 is the number of a terminal at which a device is connected to the sequence control unit 101 in the input portion 202 or the output portion 203, and is the same as the I/O number 604 of the I/O table 362. Thus, the flowchart and the I/O table are shared-data structures that allow the flowchart and the I/O table to share identical data. The step assignment address 1022 is addresses given to the above-described figures of the flowchart of FIG. 20, and is used for the sequence program 381 to identify the process. The controller-control-module assignment address 1023 is an address to assign a memory area used by the controller control module, and an I/O number, to the memory 205; and is the same as the controller-control-module assignment address 803 of the controller-control-module management table 364. Thus, the flowchart and the controller-control-module management table are shared-data structures that allow the flowchart and the controller-control-module management table to share identical data. The error output address 1024 is an address to assign a flag, used for the sequence program 381 to notify an operator of an error, to the memory 205; and is the same as the error output address 903 of the error table 365. The system-mode assignment address 1025 is an address to assign a flag, which is related to a system mode such as an automatic or manual mode, to the memory 205; and is the same as the system-mode assignment address 1111 of the basic-module address map 372. The system-state assignment address 1026 is an address to assign a flag, which is related to a system state such as a start, stop, or error state, to the memory 205; and is the same as the system-state assignment address 1112 of the basic-module address map 372. Thus, the flowchart and the basic-module address map are shared-data structures that allow the flowchart and the basic-module address map to share identical data.

The process 1031 is information on the change in all operations of the devices 141 and 152, information on the change in the state of a flag in the memory 205, and information on the computation to be performed. Note that the above-described change in all operations of the devices 141 and 152 is the same as the operation order 403 illustrated in the time chart 351. Thus, the flowchart and the time chart are shared-data structures that allow the flowchart and the time chart to share identical data. The branch condition 1032 is information to branch the process by determining the I/O number 604, the controller-control-module assignment address 803, or a flag information in the memory 205. The wait condition 1033 is information to wait for the end of pause caused by a timer or the permission to perform an operation expressed by the operation order relationship 405, and is given from another stepper. The process order 1034 is information on the order of the process 1031, the branch condition 1032, and the wait condition 1033.

The terminal 2010 illustrated in FIG. 20 is a figure to indicate the start and the end of a stepper and an error of the process 1031. The name information 1010 is written inside the figure, and the address information 1020 is written outside the figure.

The process 2020 illustrated in FIG. 20 is a figure to indicate the process 1031 other than errors. The name information 1010 is written inside the figure, and the address information 1020 is written outside the figure. The determination 2030 illustrated in FIG. 20 is a figure to indicate the branch condition 1032 and the wait condition 1033. The name information 1010 is written inside the figure, and the address information 1020 is written outside the figure. The predefined process 2040 illustrated in FIG. 20 is a figure to indicate the start of another stepper listed in the stepper configuration table 361 and indicated by the operation order relationship 405. The name information 1010 is written inside the figure, and the address information 1020 is written outside the figure.

The flowchart 366 is completed by connecting the figures of the terminal 2010, the process 2020, the determination 2030, and the predefined process 2040, with lines, depending on the information of the process order 1034. Thus, the flowchart 366 includes information of the time chart 351, the stepper configuration table 361, the I/O table 362, the controller-control-module management table 364, the error table 365, the basic-module address map 372, and the controller-control-module address map 374 (see FIG. 29 in a first embodiment described later).

However, when generated, the flowchart 366 does not contain the information of the branch condition 1032 and the wait condition 1033 of the sequence-control information 1030, the information of the process 1031 performed after the branch is performed under the branch condition 1032, and the predefined process 2040. Since creating of the branch condition 1032, the wait condition 1033, the process 1031 performed after the branch is performed, and the predefined process 2040 needs determination of a software designer, the software designer examines the flowchart 366, and completes it. That is, except for the sequence program 381, the flexible software design including the branch condition 1032, the wait condition 1033, the process 1031 performed after the branch is performed under the branch condition 1032, and the predefined process 2040 can be expressed by the flowchart 366 alone (see FIG. 30 in the first embodiment described later).

Referring back to FIG. 3, the software library 370 is illustrated. The software library 370 is a group of programs that has high versatility and that can also be used in a different production system. The software library 370 includes one or more types of the basic module 371, and corresponding types of the basic-module address map 372. In addition, the software library 370 can include a predetermined number of controller control modules 373 and corresponding types of the controller-control-module address map 374.

A program of the software library 370 is a template program that is used when the sequence program 381 is generated. Thus, the program is copied as necessary, and the copy is incorporated into the sequence program 381.

Figure 11:
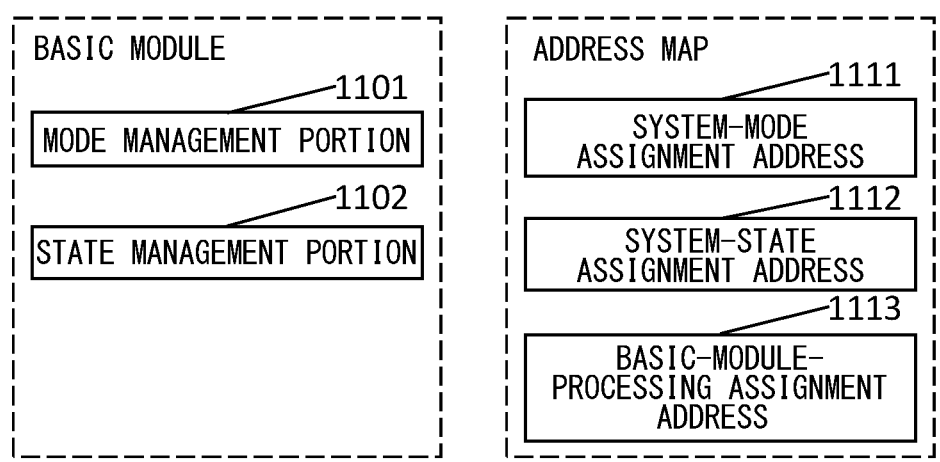
FIG. 11 illustrates processing portions of a basic module and addresses included in a basic-module address map of the embodiment of the present invention.

FIG. 11 schematically illustrates components of the basic module 371 and components of the basic-module address map 372 illustrated in FIG. 3.

The basic module 371 is a program that manages the mode and the state of the production system, and includes a mode management portion 1101 and a state management portion 1102.

The mode management portion 1101 manages the mode of the system, including an automatic mode and a manual mode. The state management portion 1102 manages the state of the system, including start, stop, and error.

The basic-module address map 372 is a list in which an assignment address of a memory area used by the basic module 371 is listed. There is a plurality of basic-module address maps 372, and types of the basic-module address maps 372 correspond to the types of the basic modules 371. Each basic-module address map 372 includes information elements that are a system-mode assignment address 1111, a system-state assignment address 1112, and a basic-module-processing assignment address 1113.

FIG. 27 illustrates one example of the basic-module address map.

The system-mode assignment address 1111 is an address assigned to a system-mode flag that indicates an automatic mode, a manual mode, and the like. The system-state assignment address 1112 is an address assigned to a system-state flag that indicates start, stop, error, and the like. The basic-module-processing assignment address 1113 is an address to assign a memory area used by the basic module to the memory 205 and other than the system-mode assignment address 1111 and the system-state assignment address 1112. An address assigned for the basic module 371 is not changed, and is fixed in the memory 205.

Referring back to FIG. 3, the controller control module 373 is illustrated. The controller control module 373 is a program that controls the controller 151. There is a plurality of controller control modules 373, and types of the controller control modules 373 correspond to the types of the controller 151. Each of the controller control modules 373 is given a corresponding controller-control-module name 802, and managed.

Figure 12:
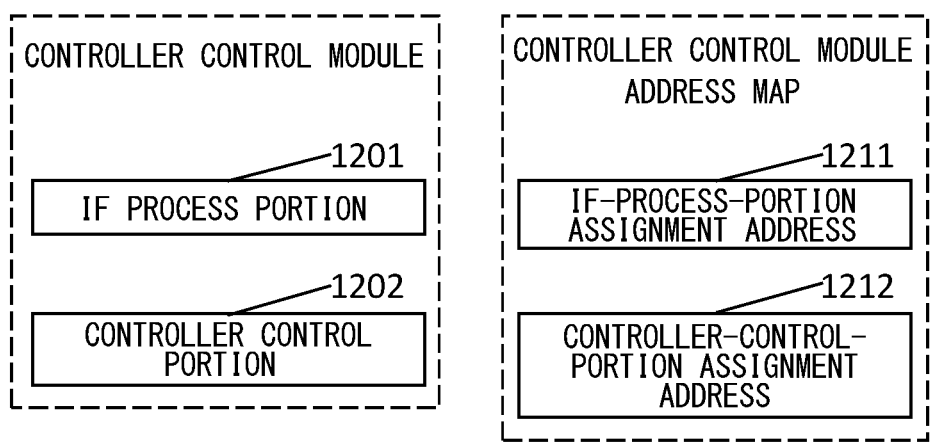
FIG. 12 illustrates processing portions of a controller control module and addresses included in a controller-control-module address map of the embodiment of the present invention.

FIG. 12 schematically illustrates components of the controller control module 373 and components of the controller-control-module address map 374 illustrated in FIG. 3.

The controller control module 373 includes an IF process portion 1201 and a controller control portion 1202. The IF process portion 1201 is an interface process portion, via which the controller and the controller control module 373 communicate with each other. The controller control portion 1202 is a control portion other than the IF process portion 1201, and controls the controller 151.

The controller-control-module address map 374 is a list in which an assignment address of a memory area used by the controller control module 373 is listed. There is a plurality of controller-control-module address maps 374, and types of the controller-control-module address maps 374 correspond to the types of the controller control modules 373. Each controller-control-module address map 374 includes information elements that are an IF-process-portion assignment address 1211 and a controller-control-portion assignment address 1212.

The IF-process-portion assignment address 1211 is an assignment address related to the connection between the controller 151, which is controlled by the controller control module 373, and the input portion 202 or the output portion 203. The controller-control-portion assignment address 1212 is an assignment address of a memory area used by the controller-control-module 373 and other than the IF-process-portion assignment address 1211.

FIG. 28 illustrates one example of the controller-control-module address map. The controller-control-module address map is related to the single-axis carrying-in robot RB1, which is illustrated in FIG. 21.

Figure 13:
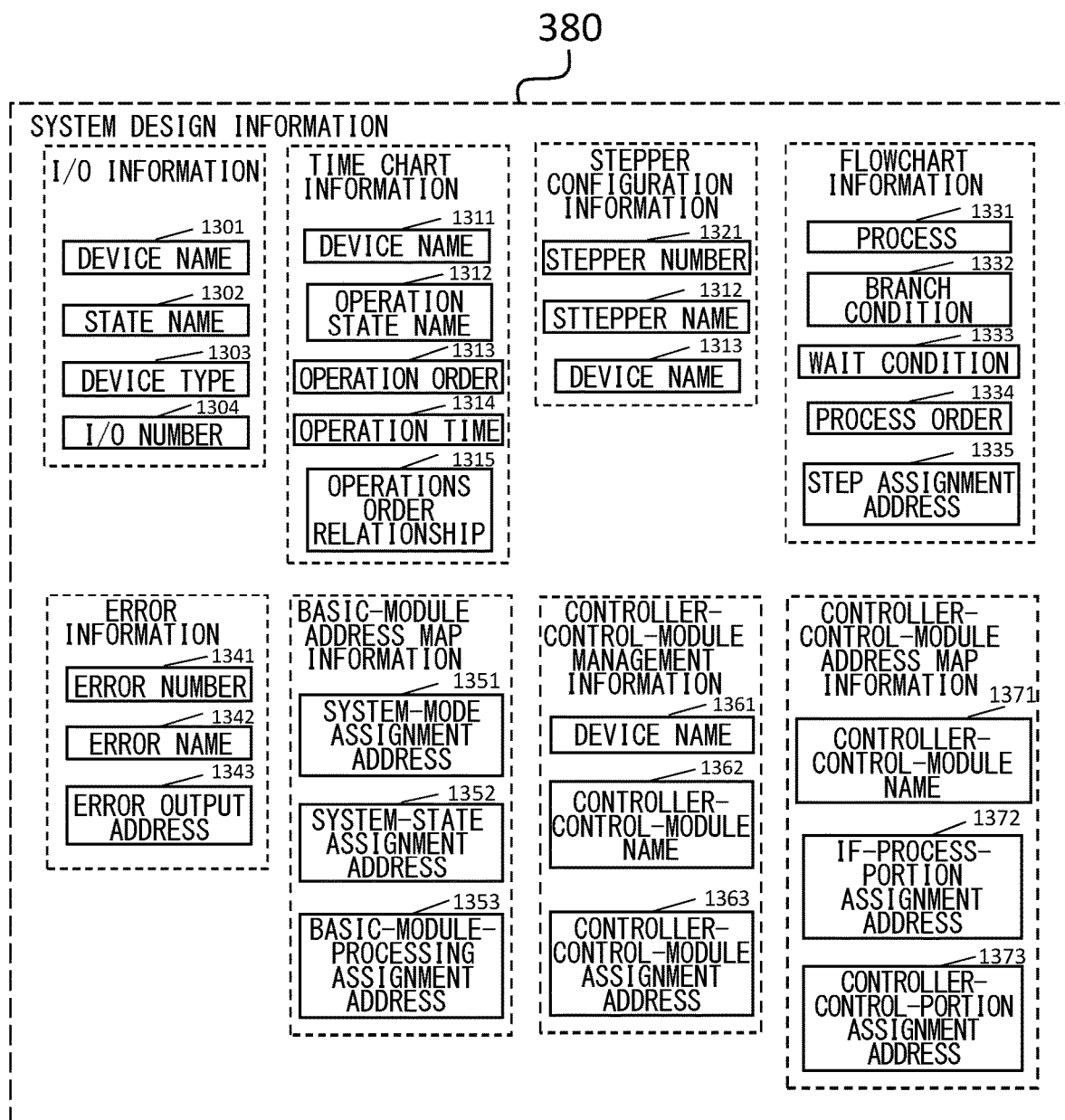
FIG. 13 illustrates information elements of system design information of the embodiment of the present invention.

As schematically illustrated in FIG. 13, the system design information 380 illustrated in FIG. 3 includes the I/O information, the time chart information, the stepper configuration information, the flowchart information, the error information, the basic-module address map information, the controller-control-module management information, and the controller-control-module address map information. Thus, the system design information 380 is a storage portion that manages these pieces of information as a whole. The information managed by the storage portion has only to be electronic information that can be managed. Thus, the format of the electronic information may be a text-file format or a database format. Each type of the documents is registered in the system design information 380, after created. Since the system design information 380 has the same data structure as that of the mechanism design document 350 and the software design document 360, the system design information 380 can be automatically generated from the mechanism design document 350 and the software design document 360, and vice versa. In addition, since the system design information 380 has the same data structure as that of the sequence program 381, the system design information 380 can be automatically converted into the sequence program 381, and vice versa.

Figure 14:
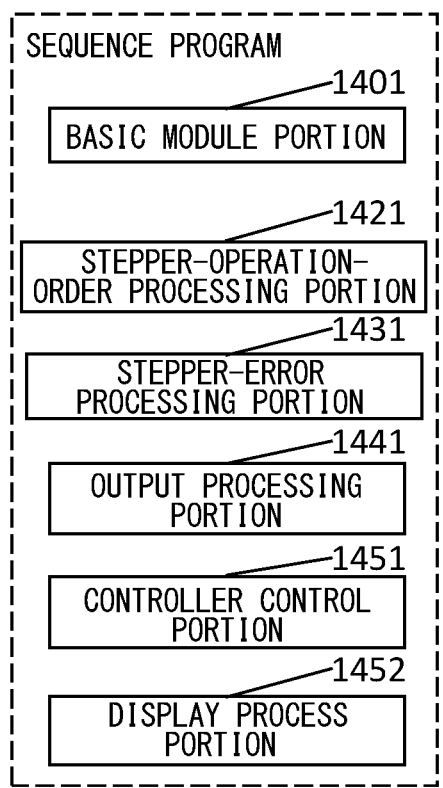
FIG. 14 illustrates programs included in a sequence program of the embodiment of the present invention.

The sequence program 381 illustrated in FIG. 3 is a program that is stored in the program storage portion 204, and that executes the sequence control for the production system. As schematically illustrated in FIG. 14, the sequence program includes a basic module portion 1401, a stepper-operation-order processing portion 1421, a stepper-error processing portion 1431, an output processing portion 1441, a controller control portion 1451, and a display process portion 1452.

The basic module portion 1401 is a processing portion that manages the mode and the state of the production system. Specifically, one of the basic modules 371 stored in the software library 370 is selected and copied, and the copy is incorporated into the basic module portion 1401. The stepper-operation-order processing portion 1421 is a processing portion that performs the sequence control. The stepper-operation-order processing portion 1421 is created by using the address information 1020 and the sequence-control information 1030. The stepper-error processing portion 1431 is a processing portion that is related to error notification. The stepper-error processing portion 1431 is created by using the address information 1020 and the sequence-control information 1030.

The output processing portion 1441 is a processing portion that sends an instruction from the operation device 131 and the stepper-operation-order processing portion 1421 to the device 141 and the controller 151. The output processing portion 1441 is created by using the address information 1020, the sequence-control information 1030, and the SW assignment table 363.

The controller control portion 1451 is a processing portion that controls the controller 151. Specifically, the controller control module 373 indicated by the controller-control-module name 802 listed in the controller-control-module management table 364 is copied, then the address assignment written in the controller-control-module address map 374 is changed depending on the controller-control-module assignment address 803, and then the copy is incorporated into the controller control portion 1451.

The display process portion 1452 is a processing portion that displays information on a display device such as the operation device 131. The display process portion 1452 is created by using the address information 1020, the sequence-control information 1030, and the SW assignment table 363.

Referring back to FIG. 3, the program storage portion 390 is illustrated. The program storage portion 390 stores programs that automatically generate the mechanism design document 350, the software design document 360, the system design information 380, and the sequence program 381. Specifically, the program storage portion 390 includes the design-document generation portion 391, the design-document design-information acquisition portion 392, the sequence-program generation portion 393, and the sequence-program-information acquisition portion 394.

The design-document generation portion 391 is a program that automatically generates the mechanism design document 350 and the software design document 360 from the system design information 380.

Figure 15:
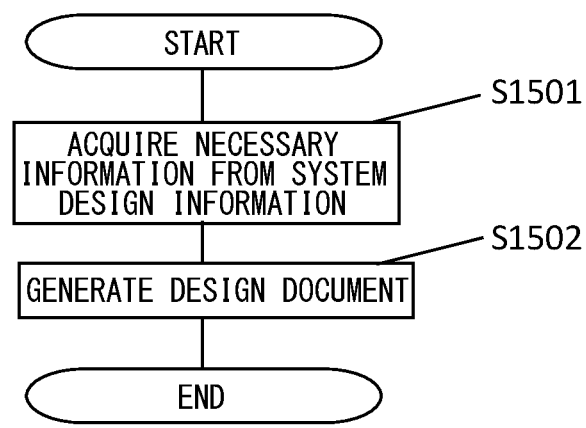
FIG. 15 illustrates processes performed by a design-document generation portion of the embodiment of the present invention.

FIG. 15 illustrates a flowchart of processes of the design-document generation portion 391. In Step S1501, the design-document generation portion 391 acquires necessary information from the system design information 380. In Step S1502, the design-document generation portion 391 performs a design-document generation process, and automatically generates the mechanism design document 350 and the software design document 360. In this process, a document to be automatically generated can be freely selected from among the mechanism design document 350 and the software design document 360.

Referring back to FIG. 3, the design-document design-information acquisition portion 392 is illustrated. The design-document design-information acquisition portion 392 is a program that inputs the information of the mechanism design document 350 and the software design document 360 into the system design information 380.

Figure 16:
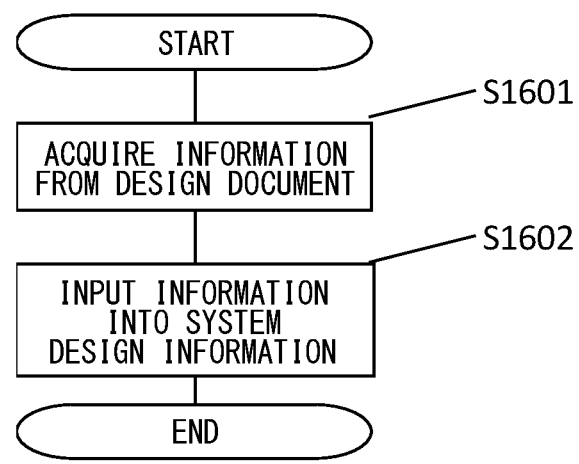
FIG. 16 illustrates processes performed by a design-document design-information acquisition portion of the embodiment of the present invention.

FIG. 16 illustrates a flowchart of processes of the design-document design-information acquisition portion 392. In Step S1601, the design-document design-information acquisition portion 392 acquires information from the design documents. In Step S1602, the design-document design-information acquisition portion 392 input the information into the system design information 380.

Referring back to FIG. 3, the sequence-program generation portion 393 is illustrated. The sequence-program generation portion 393 is a program that automatically generates the sequence program 381 from the system design information 380.

Figure 17:
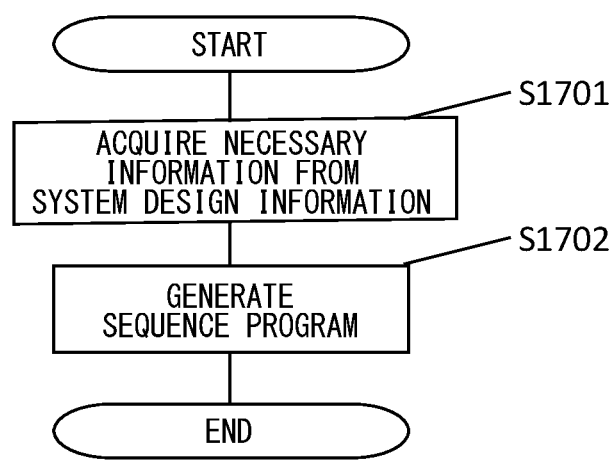
FIG. 17 illustrates processes performed by a sequence-program generation portion of the embodiment of the present invention.

FIG. 17 illustrates a flowchart of processes of the sequence-program generation portion 393. In Step S1701, the sequence-program generation portion 393 acquires necessary information from the system design information 380. In Step S1702, the sequence-program generation portion 393 generates the sequence program 381. In this process, the sequence-program generation portion 303 generates program comments to be stored in the program storage portion 204, together with the sequence program 381, by using the name information 1010.

Referring back to FIG. 3, the sequence-program-information acquisition portion 394 is illustrated. The sequence-program-information acquisition portion 394 is a program that automatically generates the system design information 380 from the sequence program 381.

Figure 18:
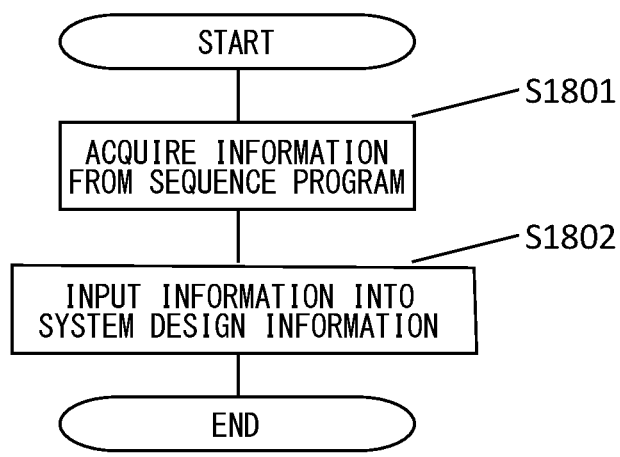
FIG. 18 illustrates processes performed by a sequence-program-information acquisition portion of the embodiment of the present invention.

FIG. 18 illustrates a flowchart of processes of the sequence-program-information acquisition portion 394. In Step S1801, the sequence-program-information acquisition portion 394 acquires information from the sequence program 381. In Step S1802, the sequence-program-information acquisition portion 394 inputs the information into the system design information 380. In this process, the sequence-program-information acquisition portion 304 generates the name information by using the program comments to be stored in the program storage portion 204, together with the system design information 380.

In the above-described embodiment of the present invention, an information processing system can be achieved. The information processing system includes a data structure, a design-document automatic-generation portion, and a sequence-program automatic-generation portion. The data structure allows the mechanism design document and the software design document to share design information that is related to both of the mechanism design document and the software design document. The design-document automatic-generation portion automatically generates the mechanism design document and the software design document by using the data structure. The sequence-program automatic-genera-tion portion automatically generates the sequence program by using the mechanism design document, the software design document, and the software library. In addition, the information processing system can include a software-design-document automatic-generation portion. Thus, if the sequence program is changed, the software-design-document automatic-generation portion automatically generates a new software design document by using the sequence program that has been changed.

Thus, the present embodiment can increase the efficiency and the accuracy of the generation work and the correction work for the mechanism design document, the software design document, and the sequence program.

Hereinafter, the embodiment of the present invention will be more specifically described with reference to some examples.

Example 1

In Example 1, the description will be made for a procedure of software design work. In the software design work, the sequence program 381 is automatically generated from the mechanism design document 350 and the software design document 360.

Figure 19:
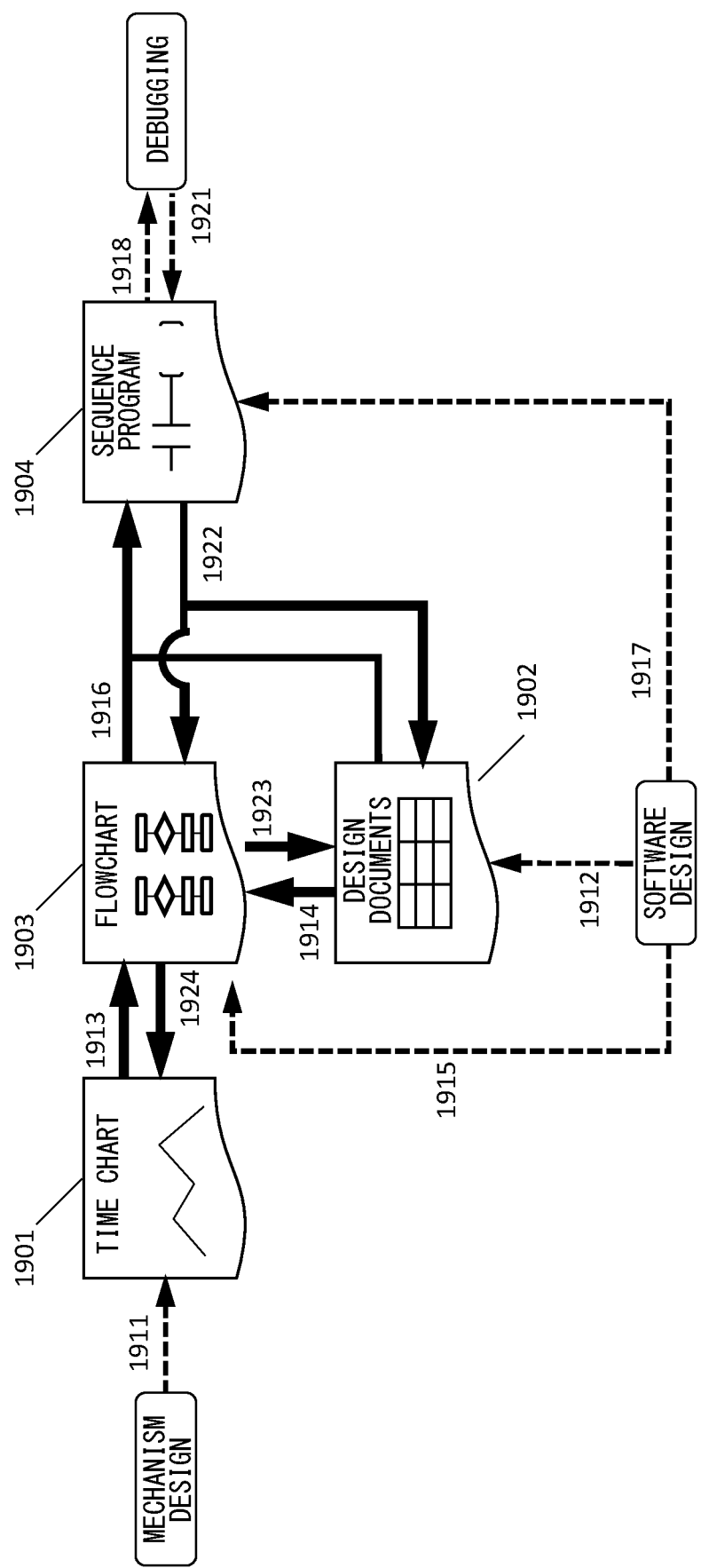
FIG. 19 illustrates an example of design work and debugging work of the embodiment of the present invention.

FIG. 19 illustrates an example of software design work. In FIG. 19, an editing process and a correcting process performed by a worker are indicated by dotted-line arrows, and processes, such as generating processes, performed automatically by the information processing device are indicated by solid-line arrows.

A mechanism designer creates a time chart 1901 in time-chart creation work 1911, and stores the time chart 1901 in the mechanism design document 350 of the information processing device. A software designer refers to the time chart 1901, and starts software design. The software designer creates design documents 1902 in design-documents creation work 1912, and stores the design documents 1902 in the software design document 360 of the information processing device. The design documents 1902 are the stepper configuration table, the I/O table, the SW assignment table, the error table, and the controller-control-module management table.

Then the design-document design-information acquisition portion 392 inputs the time chart 1901 into the system design information 380, and after that, the design-document generation portion 391 performs automatic generation 1913 of the flowchart 1903.

Figure 29:
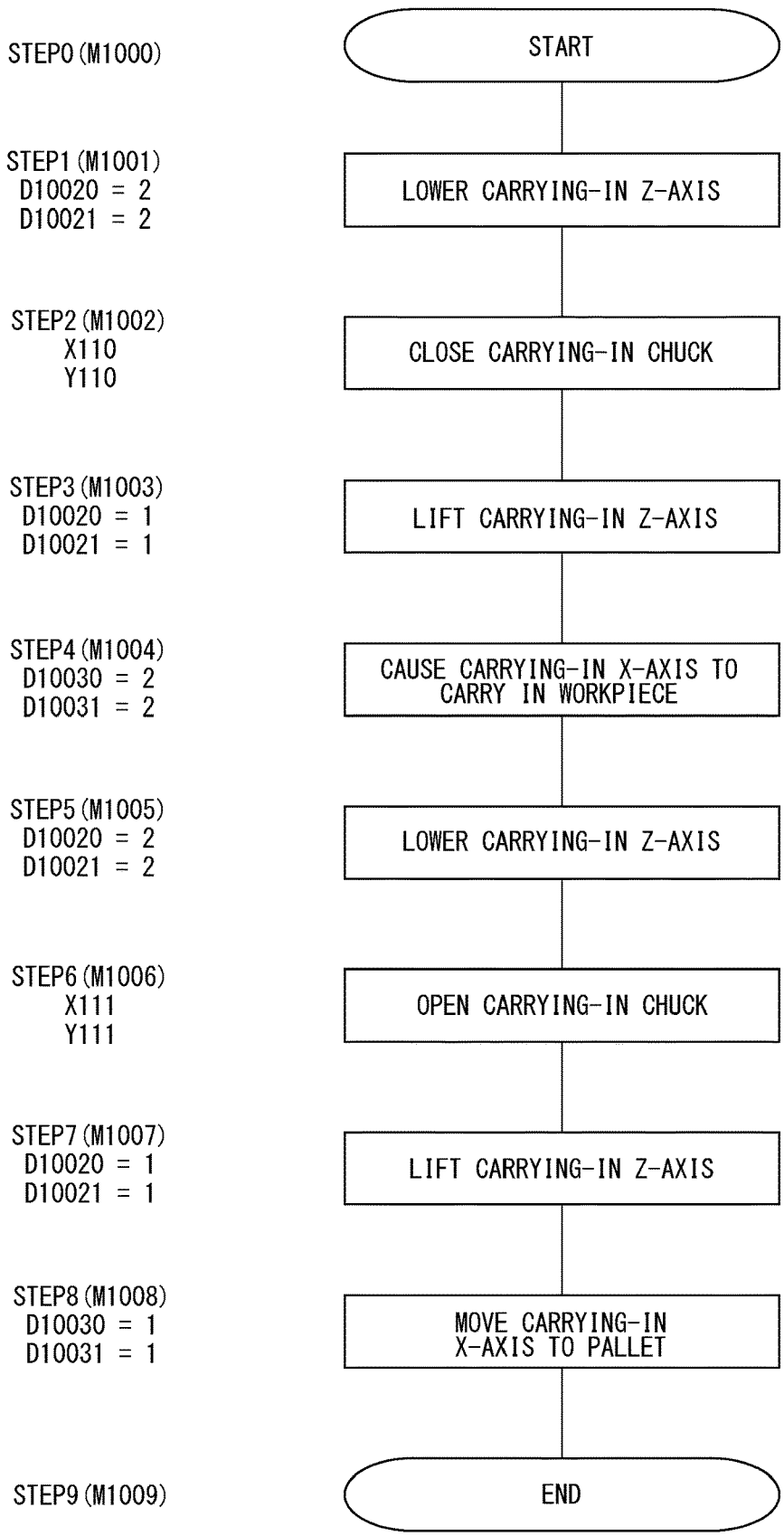
FIG. 29 illustrates one example of a flowchart that has been automatically generated in the embodiment.

FIG. 29 illustrates one example of the flowchart. The flowchart of FIG. 29 illustrates a flow of processes to carry in a workpiece, which is performed in the stepper number 3 of the stepper configuration table of FIG. 23. The flowchart is temporarily stored in the data storage portion 340, as the flowchart 366 of FIG. 3.

Then the design-document design-information acquisition portion 392 inputs the design documents 1902, which are the stepper configuration table, the I/O table, the SW assignment table, the error table, and the controller-control-module management table, into the system design information 380. After that, the design-document generation portion 391 performs automatic generation 1914 of the flowchart 1903. Note that, in practice, since the flowchart 1903 has already been generated automatically in the automatic generation 1913, the flowchart 1903 that has already been generated in the automatic generation 1913 is added with pieces of difference information.

Then the flowchart 1903 that has been created in the automatic generation 1913 and 1914 is checked by a software designer. The software designer examines system specifications, and performs editing work 1915. In the editing work 1915, the flowchart 1903 is added with the branch condition 1032, the wait condition 1033, the process 1031 performed after the branch is performed under the branch condition 1032, and the predefined process 2040.

Figure 30:
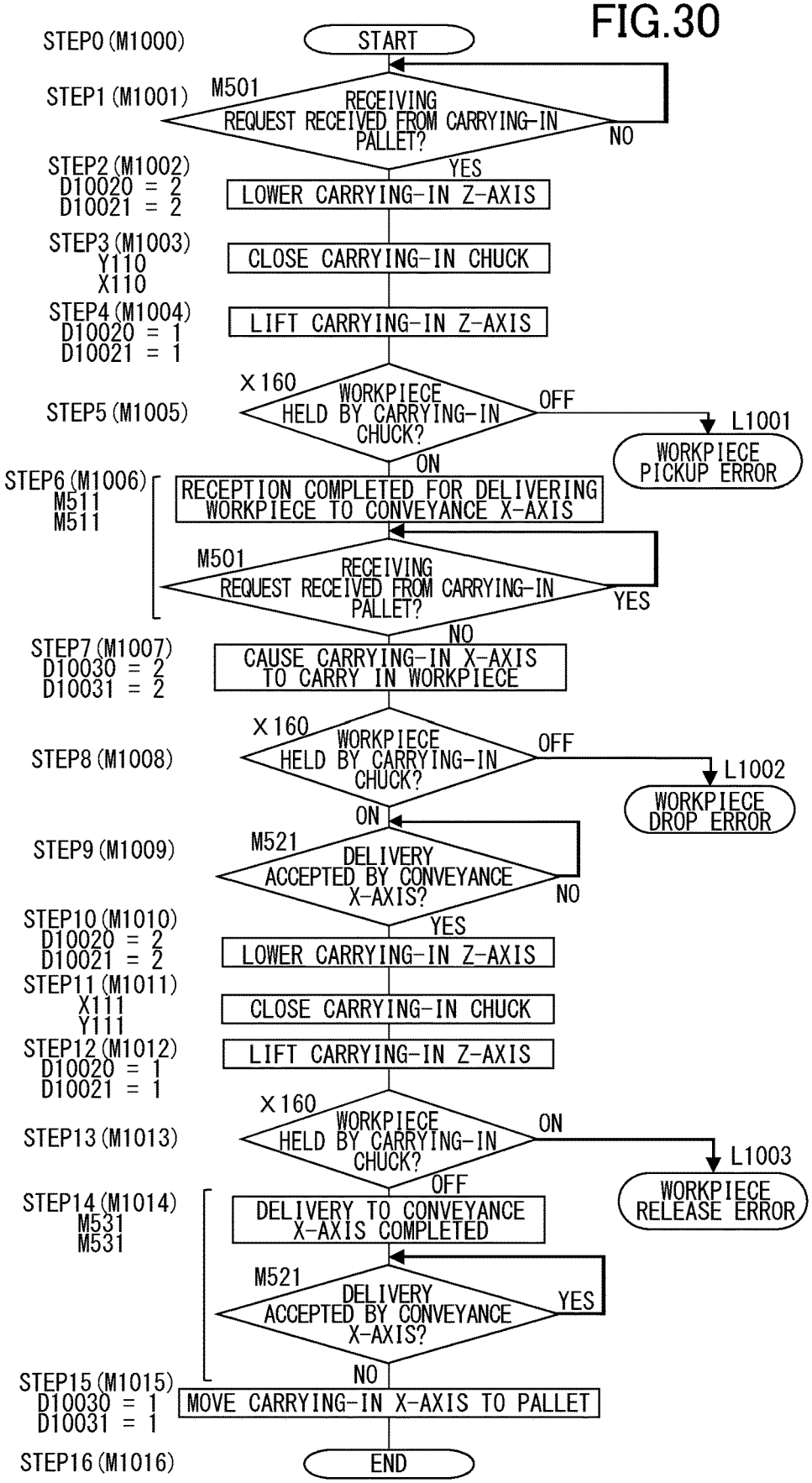
FIG. 30 illustrates one example of a flowchart that has been corrected in the embodiment.

FIG. 30 illustrates one example of the flowchart obtained after the editing work 1915 is performed. The flowchart is stored in the data storage portion 340, as the flowchart 366 of FIG. 3.

Then the design-document design-information acquisition portion 392 inputs the flowchart 1903 into the system design information 380, and after that, the sequence-program generation portion 393 performs automatic generation 1916 of the sequence program 1904.

FIGS. 31A and 31B illustrate examples of the sequence program that have been automatically generated to carry in a workpiece, which is performed in the stepper number 3 of the stepper configuration table of FIG. 23.

FIG. 31A is one example of the stepper-operation-order processing portion 1421 (see FIG. 14) included in the automatically generated sequence program 1904. FIG. 31B is one example of the stepper-error processing portion 1431 included in the automatically generated sequence program 1904. The sequence program is stored in the data storage portion 340, as the sequence program 381 of FIG. 3.

Figure 32:
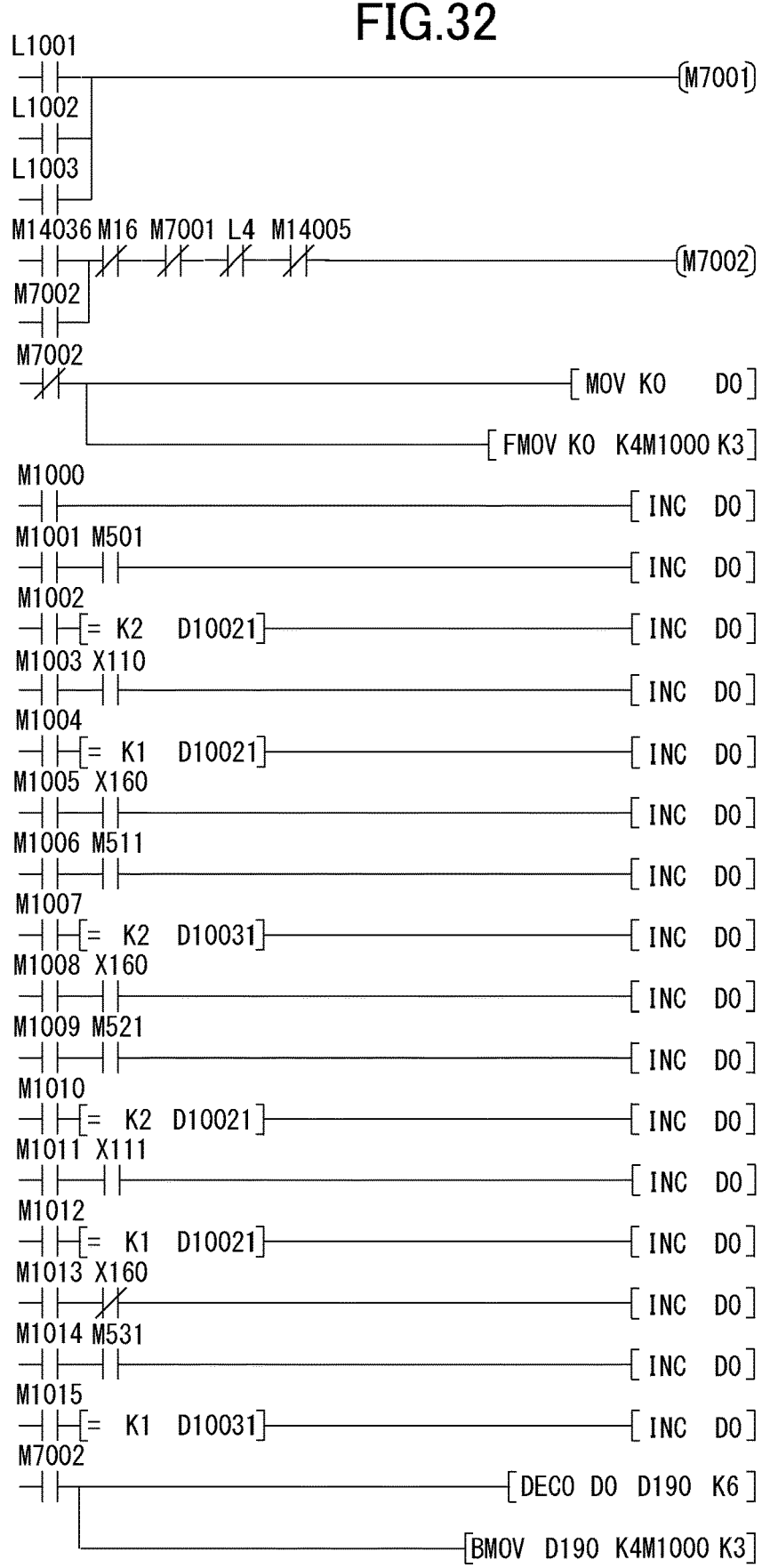
FIG. 32 illustrates one example of a ladder-format sequence program that has been automatically generated in the embodiment.
Figure 33:
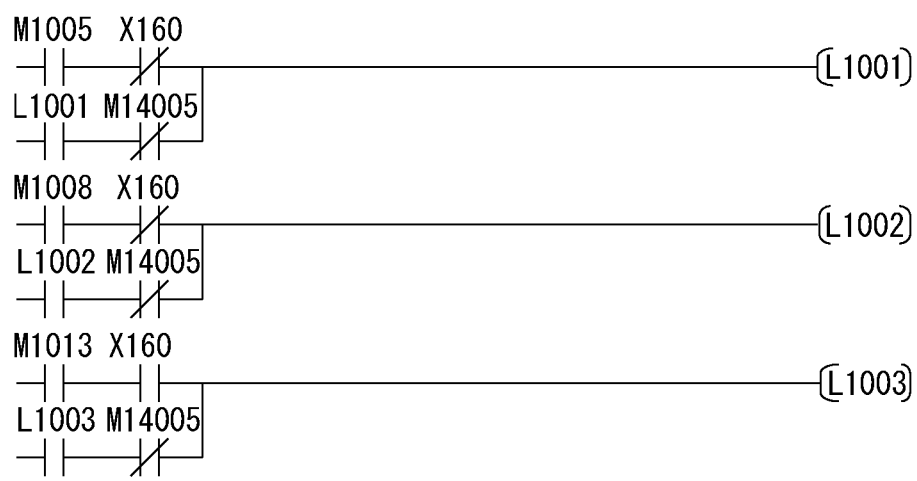
FIG. 33 illustrates one example of another ladder-format sequence program that has been automatically generated in the embodiment.

FIG. 32 is one example of the stepper-operation-order processing portion 1421 (see FIG. 14) included in the automatically generated ladder-format sequence program 1904. FIG. 33 is one example of the stepper-error processing portion 1431 included in the automatically generated ladder-format sequence program 1904. The sequence program is stored in the data storage portion 340, as the sequence program 381 of FIG. 3.

Lastly, the software designer performs check work 1917 on the sequence program 1904 that has been generated in the automatic generation 1916, and completes the software design.

Example 2

In Example 2, the description will be made for a procedure of software debugging work. In the software debugging work, the sequence program 381 is debugged and corrected, and then the software design document 360 and the mechanism design document 350 are automatically generated in feedback work.

FIG. 19 illustrates an example of the software debugging work. A person in charge of the debugging work performs debugging work 1918 on the sequence program 1904, finds an error, and performs correcting work 1921.

Then the sequence-program-information acquisition portion 394 inputs the sequence program 1904 into the system design information 380, and after that, the design-document generation portion 391 performs automatic generation 1922 of the flowchart 1903.

The person in charge of the debugging work checks that the flowchart 1903 has been corrected in accordance with the correction of the sequence program 1904. The design-document design-information acquisition portion 392 inputs the flowchart 1903 into the system design information 380. After that, the design-document generation portion 391 performs automatic generation 1923 of the design documents, which are the stepper configuration table, the I/O table, the SW assignment table, the error table, and the controller-control-module management table; and performs automatic generation 1924 of the time chart.

Example 3

In Example 3, the description will be made for a procedure of software design work. In the software design work, the sequence program 381 is generated from the software design document 360 alone without the mechanism design document 350.

FIG. 19 illustrates an example of software design work. A software designer creates design documents 1902 in design-documents creation work 1912. The design documents 1902 are the stepper configuration table, the I/O table, the SW assignment table, the error table, and the controller-control-module management table.

Then the design-document design-information acquisition portion 392 inputs the design documents 1902, which are the stepper configuration table, the I/O table, the SW assignment table, the error table, and the controller-control-module management table, into the system design information 380. After that, the design-document generation portion 391 performs automatic generation 1914 of the flowchart 1903.

Then the software designer examines system specifications, and performs editing work 1915 as flowchart design work. In the editing work 1915, the software designer disposes the figures of the terminal 2001, the process 2002, the determination 2003, and the predefined process 2004 in the flowchart 1903; and writes information necessary for the figures, in the flowchart 1903.

Then the design-document design-information acquisition portion 392 inputs the flowchart 1903 into the system design information 380, and after that, the sequence-program generation portion 393 performs automatic generation 1916 of the sequence program 1904.

Lastly, the software designer performs check work 1917 on the sequence program 1904 that has been generated in the automatic generation 1916, and completes the software design.

Modifications

The present invention is not limited to the above-described embodiment and examples, and can be variously modified within the technical concept of the present invention.

The information processing method and the information processing device of the present invention can be used for creating software and programs for not only the production facility but also various machines and facilities, such as an industrial robot, a service robot, and a processing machine that is numerically controlled by a computer. For example, the machines and facilities can automatically perform expansion and contraction, bending and stretching, up-and-down movement, right-and-left movement, pivot, or combined movement thereof, in accordance with information stored in the storage device of the control device.

The information processing device of the present invention may be integrated with machine equipment for forming a production system or the like. A sequence program that has been automatically generated from a design document by using the information processing method of the present invention, or a design document that has been automatically generated from the sequence program is also included in the embodiments of the present invention. In addition, a method of manufacturing products by controlling machine equipment, such as an industrial robot, by using a sequence program that has been automatically generated from a design document by using the information processing method or the information processing device of the present invention is also included in the embodiments of the present invention.

In addition, a method related to the above-described information processing operation, and a computer-readable recording medium that stores a control program that can execute the control method are also included in the embodiments of the present invention. The recording medium for providing the control program may be a ROM, a disk, or an external storage device. Specifically, the computer-readable non-transitory recording medium may be a flexible disk, an optical disk, a magneto-optical disk, a magnetic tape, a nonvolatile memory such as a USB memory, or an SSD.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-50520, filed Mar. 23, 2020, and Japanese Patent Application No. 2020-179432, filed Oct. 27, 2020, which are hereby incorporated by reference herein in their entirety.

What is claimed is:

1. An information processing device comprising:
a data structure configured to share design information among a time chart, a flow chart, and a sequence program;
an input portion configured to receive from a user an instruction to change at least one of the time chart, the flow chart, and the sequence program; and
at least one processor and at least one memory that are configurable to cause the information processing apparatus to:
generate and link the time chart, the flow chart, and the sequence program, based on the data structure, with (1) the flow chart being generatable by using (i) the data structure and (ii) the time chart or the sequence program, (2) the time chart being generatable by using (i) the data structure and (ii) the flow chart or the sequence program, (3) the sequence program being generatable by using (i) the data structure and (ii) the flow chart or the time chart;
automatically modify the time chart based on the data structure and a received instruction to change at least one of the flow chart or the sequence program;
automatically modify the flow chart based on the data structure and a received instruction to change at least one of the time chart or the sequence program; and
automatically modify the sequence program on the data structure and a received instruction to change at least one of the flow chart or the time chart.

2. The information processing device according to claim 1, wherein if a generated sequence program is changed, the at least one processor and the at least one memory are configurable to generate the data structure that corresponds to the changed sequence program, in accordance with the changed sequence program.

3. The information processing device according to claim 1, wherein the design information comprises at least one of a stepper configuration table, an I/O table and/or controller-control-module management table and an error table.

4. The information processing device according to claim 1, wherein the input portion includes:
a first input-processing portion configured to edit the time chart;
a second input-processing portion configured to edit the flow chart; and
a third input-processing portion configured to edit the sequence program.

5. The information processing device according to claim 1, wherein the design information and the sequence program have a same data structure.

6. The information processing device according to claim 1, wherein the at least one processor and the at least one memory are configurable to accept editing by the user, of at least one of a branch condition, a wait condition, processing content, and predefined processing content in the flow chart.

7. The information processing device according to claim 1, wherein the at least one processor and the at least one memory are configurable to accept editing by the user, of at least one of a device name, an operation state name, an operation order, an operation time, and an operation order relationship of the time chart.

8. The information processing device according to claim 1, wherein the at least one processor and the at least one memory are configurable to modify the flow chart based on the change of the time chart made by the user and modify the sequence program based on a modified flow chart,
wherein the at least one processor and the at least one memory are configurable to modify the flow chart based on the change of the sequence program made by the user and modify the time chart based on a modified time chart, and
wherein the at least one processor and the at least one memory are configurable to modify the time chart and the sequence program based on the change of the flow chart made by the user.

9. The information processing device according to claim 1, wherein the sequence program includes ladder-format program.

10. The information processing device according to claim 1,
wherein if the user inputs the change instruction to one of the time chart, the flow chart, and the sequence program by using the input portion, then the at least one processor and the at least one memory automatically modify, based on the data structure and the change instruction received from the user, the other two of the time chart, the flow chart, and the sequence program that have not been changed.

11. An information processing method based on a data structure, wherein the data structure is configured to share design information among a time chart, a flow chart, and a sequence program, the method comprising:
generating and linking, by at least one process and at least one memory, the time chart, the flow chart, and the sequence program, based on the data structure, with (1) the flow chart being generatable by using (i) the data structure and (ii) the time chart or the sequence program, (2) the time chart being generatable by using (i) the data structure and (ii) the flow chart or the sequence program, (3) the sequence program being generatable by using (i) the data structure and (ii) the flow chart or the time chart,
receiving from a user, by an input portion, an instruction to change one of the time chart, the flow chart, and the sequence program;
automatically modifying the time chart based on the data structure and a received instruction to change at least one of the flow chart or the sequence program;
automatically modifying the flow chart based on the data structure and a received instruction to change at least one of the time chart or the sequence program; and
automatically modifying the sequence program on the data structure and a received instruction to change at least one of the flow chart or the time chart.

12. The information processing method according to claim 11, wherein if a generated sequence program is changed, the data structure is generated to correspond to the changed sequence program, in accordance with the changed sequence program.

13. The information processing method according to claim 11, wherein the design information comprises at least one of a stepper configuration table an I/O table and/or controller-control-module management table and an error table.

14. The information processing method according to claim 11, wherein the input portion comprises a first input-processing portion, a second input-processing portion, and a third input-processing portion,
wherein the first input-processing portion is configured to accept an instruction to edit the time chart,
wherein the second input-processing portion is configured to accept an instruction to edit the flow chart, and
wherein the third input-processing portion is configured to accept an instruction to edit the sequence program.

15. A computer-readable non-transitory recording medium storing a control program that causes a computer to execute the information processing method according to claim 11.

16. A method of manufacturing a product by controlling a robot by using a sequence program processed by the information processing device according to claim 1.

* * * * *